United States Patent
Izumi

(10) Patent No.: US 8,977,039 B2
(45) Date of Patent: *Mar. 10, 2015

(54) PULLING KEYS FROM COLOR SEGMENTED IMAGES

(71) Applicant: Deluxe 3D LLC, Burbank, CA (US)

(72) Inventor: Kuniaki Izumi, Burbank, CA (US)

(73) Assignee: Deluxe 3D LLC, Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/010,414

(22) Filed: Aug. 26, 2013

(65) Prior Publication Data

US 2013/0343638 A1 Dec. 26, 2013

Related U.S. Application Data

(63) Continuation of application No. 12/634,368, filed on Dec. 9, 2009, now Pat. No. 8,538,135.

(51) Int. Cl.
| | |
|---|---|
| *G06T 19/00* | (2011.01) |
| *G06T 15/80* | (2011.01) |
| *G06T 7/00* | (2006.01) |
| *H04N 13/02* | (2006.01) |

(52) U.S. Cl.
CPC ............. *G06T 15/80* (2013.01); *G06T 7/0051* (2013.01); *G06T 2207/10024* (2013.01); *H04N 13/0257* (2013.01); *H04N 13/026* (2013.01)
USPC ........................................................ 382/154

(58) Field of Classification Search
None
See application file for complete search history.

(56) References Cited

U.S. PATENT DOCUMENTS

| | | | |
|---|---|---|---|
| 4,925,294 A * | 5/1990 | Geshwind et al. ............. | 352/57 |
| 6,081,269 A | 6/2000 | Quarendon | |
| 6,208,348 B1 | 3/2001 | Kaye | |
| 6,515,659 B1 | 2/2003 | Best | |
| 6,686,926 B1 | 2/2004 | Kaye | |
| 7,102,633 B2 | 9/2006 | Kaye | |
| 7,116,323 B2 | 10/2006 | Kaye | |
| 7,116,324 B2 | 10/2006 | Kaye | |
| 7,945,088 B2 * | 5/2011 | Era .............................. | 382/154 |
| 8,351,689 B2 * | 1/2013 | Turner et al. .................. | 382/162 |
| 8,538,135 B2 | 9/2013 | Izumi | |
| 2002/0061131 A1 | 5/2002 | Sawhney et al. | |
| 2002/0118275 A1 | 8/2002 | Harman | |
| 2002/0139920 A1 | 10/2002 | Seibel et al. | |

(Continued)

OTHER PUBLICATIONS

USPTO; Office Action issued in U.S. Appl. No. 12/634,368, mailed Nov. 8, 2012, 7 pages.

(Continued)

*Primary Examiner* — Brian P Werner
(74) *Attorney, Agent, or Firm* — Fitch, Even, Tabin & Flannery LLP

(57) ABSTRACT

Described are computer-based methods and apparatuses, including computer program products, for pulling keys from color segmented images. Data indicative of a two dimensional image is stored in a data storage device, the two dimensional image comprising a plurality of pixels. A plurality of color segmented frames are generated based on the two dimensional image, wherein each color segmented frame comprises one or more objects. For each of the color segmented frames, a key is generated based on the one or more objects. A depth map is calculated for the two dimensional image based on the keys, wherein the depth map comprises data indicative of three dimensional information for each pixel of the two dimensional image.

23 Claims, 12 Drawing Sheets

(56) References Cited

U.S. PATENT DOCUMENTS

| | | |
|---|---|---|
| 2004/0032488 A1 | 2/2004 | Harman |
| 2005/0089212 A1 | 4/2005 | Mashitani et al. |
| 2005/0129316 A1 | 6/2005 | Curti et al. |
| 2005/0146521 A1 | 7/2005 | Kaye |
| 2005/0231505 A1 | 10/2005 | Kaye |
| 2006/0050383 A1 | 3/2006 | Takemoto et al. |
| 2007/0008342 A1 | 1/2007 | Sethuraman et al. |
| 2008/0158345 A1 | 7/2008 | Schklair |
| 2008/0273081 A1 | 11/2008 | Lipton |
| 2010/0014781 A1 | 1/2010 | Liu et al. |
| 2010/0182406 A1 | 7/2010 | Benitez |
| 2011/0002541 A1 | 1/2011 | Varekamp |
| 2011/0074778 A1* | 3/2011 | Turner et al. ............... 345/420 |
| 2011/0134109 A1 | 6/2011 | Izumi |
| 2011/0135194 A1 | 6/2011 | Izumi |

OTHER PUBLICATIONS

USPTO; Notice of Allowance issued in U.S. Appl. No. 12/634,368, mailed Feb. 20, 2013, 5 pages.

USPTO; Notice of Allowance issued in U.S. Appl. No. 12/634,368, mailed May 14, 2013, 9 pages.

USPTO; Office Action issued in U.S. Appl. No. 12/634,379, mailed Apr. 5, 2013, 8 pages.

USPTO; Notice of Allowance & Examiner-Initiated Interview Summary issued in U.S. Appl. No. 12/634,379, mailed Sep. 19, 2013, 16 pages.

Patent Cooperation Treaty; International Search Report and Written Opinion from the International Searching Authority issued in PCT/US2010/059385, mailed May 26, 2011, 17 pages.

Okamoto, Akira, et al.; "Integration of Color and Range Data for Three-Dimensional Scene Description", IEICE Transactions on Information & Systems, Information & Systems Society, Tokyo, Japan, vol. E76-D, No. 4; pp. 501-506 (Apr. 1993).

Hirata, S., et al; "Scene Interpretation Using 3-D Information Extracted From Monocular Color Images", Proceeding of the 1992 IEEE/RSJ International Conference on Intelligent Robots and Systems, Raleigh, NC; pp. 1603-1610 (Jul. 7-10, 1992).

Harman, et al.; "Rapid 2D to 3D Conversion", Proceedings of SPIE, vol. 4660, Jan. 21, 2002, pp. 78-86.

* cited by examiner

PULLING KEYS FROM COLOR SEGMENTED IMAGES

This application is a continuation of U.S. application Ser. No. 12/634,368 filed Dec. 9, 2009, which is incorporated in its entirety herein by reference.

FIELD OF THE INVENTION

The present invention relates generally to computer-based methods and apparatuses, including computer program products, for three dimensional rendering, and particularly to pulling keys from color segmented images and auto-stereoscopic interpolation.

BACKGROUND

Three-dimensional (3D) imaging is a technique of creating the illusion, of depth in an image so that the depth is perceived by a viewer. With stereoscopic imaging, the illusion of depth (e.g., for a two-dimensional (2D) image, photograph, or movie) can be created by presenting a slightly different image to each eye for the scene depicted within the media. Typically, for the viewer to perceive the depth of the media, the user must view the stereoscopic images through, some type of special viewing apparatus, such as special headgear or glasses. Auto-stereoscopic imaging, in contrast to stereoscopic viewing, is a technique of displaying 3D images that can be viewed without the use of any special viewing apparatus.

While the media industry has made advances in 3D imaging, there still exist many challenges with efficiently and accurately extracting objects from the image and properly creating depth information for the objects. Color segmentation is a deductive process that can be used to extract large homogeneous regions based on color and/or texture. Color segmentation takes the original 2D image, which can have hundreds or thousands of colors, and narrows down the number of colors in the 2D image to a smaller sub-set of different colors. The resulting color-segmented images can be used to generate a depth image that is representative of the depth information for each pixel or object within the image.

Additionally, to speed up the computation time required to generate 3D images from 2D images, one solution is to employ automatic rotoscoping. Rotoscoping refers to the process for drawing out objects within an image. In its most traditional form, rotoscoping referred to creating a matte (which is used to combine two or more image elements into a single, final image) for an element on a live-action plate so the element can be composited over another background. Bezier curves can be employed to automatically define 2D curves by evaluating an object at variously spaced points and then converting the approximating sequence of line segments to represent the 2D outline of the object. However, by only using Bezier curves, the object is often only "loosely" outlined due to the desire to limit the number of Bezier points to increase efficiency of the 3D rendering (e.g., the less points that need to be transposed from frame to frame, the quicker the processing time since less points need to be manipulated). Therefore, it is advantageous to use as few Bezier points as possible, which results in only a coarsely-traced outline.

Depth maps can be generated to indicate what areas of objects within the 2D images are closer to the viewer or are further away from the viewer. While depth maps can be generated based on a single 2D image, depth maps are often generated using stereo pairs (a pair of images taken by a corresponding pair of cameras, where the cameras are configured such that two different vantage points are captured by each camera and there is a known relationship between the cameras). In order for the depth map to be generated, a common point between the images is often required to correlate the vantage point information properly. For example, fragments (e.g., a predetermined pixel square) can be compared between the images to determine the common point. However, this process is extremely dependent on the accuracy of the selection of a common point within the two images, which is a non-trivial, time-consuming selection. Therefore, while various techniques have been adapted to create 3D images to increase efficiency and speed, the process is still time-consuming, complicated, and expensive.

SUMMARY OF THE INVENTION

The invention, in one aspect, features a computerized method for pulling keys from a plurality of color segmented images. The method includes storing data indicative of a two dimensional image in a data storage device, the two dimensional image comprising a plurality of pixels. The method further includes generating, by a color segmentation unit of a computer, a plurality of color segmented frames based on the two dimensional image, wherein each color segmented frame comprises one or more objects. The method further includes generating, by the color segmentation unit, for each of the color segmented frames, a key based on the one or more objects, and calculating, by a depth map unit of the computer, a depth map for the two dimensional image based on the keys, wherein the depth map comprises data indicative of three dimensional information for each pixel of the two dimensional image.

The invention, in another aspect, includes a system for pulling keys from a plurality of color segmented images. The system includes a data storage device configured to store data indicative of a two dimensional image, the two dimensional image comprising a plurality of pixels. The system includes a color segmentation unit in communication with the data storage device configured to generate a plurality of color segmented frames based on the two dimensional image, wherein each color segmented frame comprises one or more objects, and to generate, for each of the color segmented frames, a key based on the one or more objects. The system includes a depth map unit in communication with the color segmentation unit and the data storage device configured to calculate a depth map for the two dimensional image based on the keys, wherein the depth map comprises data indicative of three dimensional information for each pixel of the two dimensional image.

The invention, in another aspect, includes a computer program product. The computer program product is tangibly embodied in a computer readable storage medium. The computer program product includes instructions being operable to cause a data processing apparatus to store data indicative of a two dimensional image in a data storage device, the two dimensional image comprising a plurality of pixels, and to generate, by a color segmentation unit of a computer, a plurality of color segmented frames based on the two dimensional image, wherein each color segmented frame comprises one or more objects. The computer program product also includes instructions being operable to cause a data processing apparatus to generate, by the color segmentation unit, for each of the color segmented frames, a key based on the one or more objects, and to calculate, by a depth map unit of the computer, a depth map for the two dimensional image based on the keys, wherein the depth map comprises data indicative of three dimensional information for each pixel of the two dimensional image.

The invention, in another aspect, includes a computerized method for auto-stereoscopic interpolation. The method includes receiving, by an input unit of a computer, a first two dimensional image and a second two dimensional image, each two dimensional image comprising a pixel size, and generating, by a preprocessing unit of the computer, a reduced pixel image for each of the first and second two dimensional images, wherein each reduced pixel image comprises a reduced pixel size that is less than the pixel size. The method also includes calculating, by the preprocessing unit, boundary information for each of the first and second two dimensional images, calculating, by a depth map unit of the computer, a depth map for the first and second reduced pixel images, wherein the depth map comprises data indicative of three dimensional information for one or more objects in the first and second reduced pixel images, and calculating, by the depth map unit of the computer, a depth map for the first and second two dimensional images based on the boundary information for each of the first and second two dimensional images and the depth map of the first and second reduced pixel images.

The invention, in another aspect, includes a system for auto-stereoscopic interpolation. The system includes an input unit configured to receive a first two dimensional image and a second two dimensional image, each two dimensional image comprising a pixel size. The system also includes a preprocessing unit in communication with the input unit configured to generate a reduced pixel image for each of the first and second two dimensional images, wherein each reduced pixel image comprises a reduced pixel size that is less than the pixel size, and to calculate boundary information for each of the first and second two dimensional images. The system includes a depth map unit in communication with the preprocessing unit configured to calculate a depth map for the first and second reduced pixel images, wherein the depth map comprises data indicative of three dimensional information for one or more objects in the first and second reduced pixel images, and to calculate a depth map for the first and second two dimensional images based on the boundary information for each of the first and second two dimensional images and the depth map of the first and second reduced pixel images.

The invention, in another aspect, includes a computer program product. The computer program product is tangibly embodied in a computer readable storage medium. The computer program product includes instructions being operable to cause a data processing apparatus to receive a first two dimensional image and a second two dimensional image, each two dimensional image comprising a pixel size, and to generate a reduced pixel image for each of the first and second two dimensional images, wherein each reduced pixel image comprises a reduced pixel size that is less than the pixel size. The computer program product also includes instructions being operable to cause a data processing apparatus to calculate boundary information for each of the first and second two dimensional images, to calculate a depth map for the first and second reduced pixel images, wherein the depth map comprises data indicative of three dimensional information for one or more objects in the first and second reduced pixel images, and to calculate a depth map for the first and second two dimensional images based on the boundary information for each of the first and second two dimensional images and the depth map of the first and second reduced pixel images.

In other examples, any of the aspects above can include one or more of the following features. In some examples, the systems and methods can allow adjustment of Bezier points of a Bezier map of an object (e.g., after the initial color segmentation fails in accuracy or does not produce the desired effect). In some examples, for each color segmented frame, an edge of each object of the one or more objects can be defined by automatically calculating a Bezier map of the object, the Bezier map comprising a plurality of Bezier points about the object and a plurality of Bezier curves connecting the plurality of Bezier points, receiving data indicative of adjusting the Bezier map; and generating a more-detailed map of the object based on the data, wherein the more-detailed map comprises a plurality of additional points in combination with the plurality of Bezier points.

In some examples, generating the color segmented frames can include defining a plurality of base colors, wherein each base color is used to generate a color segmented frame. Each base color from the plurality of base colors can include a predefined range of color values, wherein a pixel comprising a color value within the predefined range of color values is associated with a color segmented frame generated based on the base color. Data indicative of a new range of color values for one or more colors of the plurality of base colors can be received, and the predefined range of color values for each of the one or more colors can be adjusted based on the data. The plurality of base colors can include, for each color of the plurality of base colors, a color pair that includes a light color and a dark color. The plurality of base colors can include brown and beige.

In other examples, calculating the depth map can include determining a three dimensional representation of an object in the two dimensional image results in a portion of the object coming in view that was not in view in the two dimensional image, and stretching a background behind the object, a side of the object, or both, to fill in the portion of the object coming into view. Calculating the depth map can include determining a three dimensional representation of an object in the two dimensional image results in a portion of the object going out of view that was in view in the two dimensional image, and shrinking a side of the object to hide the portion of the object going out of view.

In some examples, calculating the depth map can include calculating the three dimensional information for each pixel based on a key factor of the plurality of color segmented frames. The key factor can include the HLS color space (hue, lightness and saturation) of the pixel. Calculating can include determining whether the level of saturation, the level of lightness, or both are a high level or a low level, and if the level of saturation or lightness is a high level, assigning the pixel a near depth value, or if the level of saturation or lightness is a low level, assigning the pixel a far depth value. The key factor can include an amount of value change among the pixel and a group of neighboring pixels. Calculating can include determining, based on the value change, whether the pixel is part of a flat plane, and if the pixel is part of the flat plane, assigning the pixel a far depth value.

In other examples, the key factor can include a position of each of the one or more objects in each color segmented frame. Calculating can include, for each object, if the position of the object is a lower position of the color segmented frame, assigning each pixel within the object a near depth value, if the position of the object is an upper position of the color segmented frame, assigning each pixel within the object a far depth value, if the position of the object is within a corresponding object of another color segmented frame, assigning each pixel within the object a near depth value, or if the position of the object is at an edge portion of the color segmented frame, assigning each pixel within the object a far depth value. The key factor can include a ratio of a size of each of the one or more objects in each color segmented frame to a size of the color segmented frame, and calculating comprises, for each object, assigning a depth value to each pixel within the object based on the ratio. The key factor can include information indicative of a position of an object in the two dimensional image and a position of a corresponding object in a serial two dimensional image. Calculating can include determining the position of the object in the two dimensional image is different than the position of the corresponding object in the serial two dimensional image, and assigning each pixel within the object a near depth value.

In some examples, data indicative of a previously generated depth map can be stored in the data storage device, the depth map comprising data indicative of three dimensional information for each pixel of a corresponding two dimensional image, and a new depth map can be generated based on the previously generate depth map, wherein the new depth map comprises data indicative of a larger range of three dimensional information for each pixel of a corresponding two dimensional image. Calculating the depth map can include applying one or more experience rules to adjust the depth map, each rule being configured to adjust the depth map based on a human perception of one or more objects in the two dimensional image.

In other examples, the system can include an input unit configured to receive the data indicative of the two dimensional image and to store the data in the data storage device, and to receive data indicative of a previously generate depth map and to store the data indicative of the previously generate depth map in the data storage device. The system can include an edge generation unit configured to generate edge information for each object in the two dimensional image. The system can include a three dimensional experience unit configured to apply one or more experience rules to adjust the depth map, each rule being configured to adjust the depth map based on a human perception of one or more objects in the two dimensional image.

In some examples, a third two dimensional image can be generated based on the depth map for the first and second two dimensional images, wherein the third two dimensional image comprises a vantage point that is between a first vantage point of the first two dimensional image and a second vantage point of the second two dimensional image. Calculating the depth map for the first and second reduced pixel images can include generating the data based on a difference in pixel locations for each of the objects in the reduced pixel images.

In other examples, the method includes comparing two corresponding pixels, wherein a first pixel of the two corresponding pixels is located within the first reduced pixel image and a second pixel of the two corresponding pixels is located within the second reduced pixel image, calculating a distance value indicative of how far apart the first pixel is from the second pixel, and assigning data indicative of depth information for the two corresponding pixels in the depth map to indicate the object is away from a viewer for a three dimensional view that includes the object. The method can further include comparing two corresponding pixels, wherein a first pixel of the two corresponding pixels is located within the first reduced pixel image and a second pixel of the two corresponding pixels is located within the second reduced pixel image, calculating a cross value indicative of how far crossed the first pixel is from the second pixel, and assigning data indicative of depth information for the two corresponding pixels in the depth map to indicate the object is close to a viewer for a three dimensional view that includes the object.

In some examples, the pixel size can be calculated as the product of a length of pixels and a width of pixels of each corresponding two dimensional image. Calculating a depth map for the first and second two dimensional images can include calculating the depth map of each boundary pixel for the boundary information based on the first and second two dimensional images, and determining depth information of the depth map for remaining pixels with data near corresponding boundary pixels of the first and second reduced pixel images.

In other examples, calculating the boundary information includes generating a plurality of color segmented frames based on the two dimensional image, wherein each color segmented frame comprises one or more objects, and for each pixel of the first and second reduced pixel images, setting a boundary point indicator for the pixel based on the color segmented frames, wherein the boundary point indicator comprises data indicative of whether or not the pixel is a boundary point. Each of the plurality of color segmented frames can be verified to ensure it includes one or more cohesive objects, each cohesive object comprising identifiable boundary lines.

In some examples, calculating the depth map includes identifying a hidden pixel of the first reduced pixel image by identifying a visible pixel within the first reduced pixel image, wherein the visible pixel does not have a corresponding pixel within the second reduced pixel image. A third two dimensional image can be generated based on the depth map for the first and second two dimensional images, wherein the third two dimensional image comprises a vantage point that is between a first vantage point of the first two dimensional image and a second vantage point of the second two dimensional image, and wherein the third two dimensional image comprises an area corning into view or an area going out of view based on the identified hidden pixel.

In other examples, the system can include a color segmentation unit in communication with the preprocessing unit configured to generate a plurality of color segmented frames based on the two dimensional image, wherein each color segmented frame comprises one or more objects. The system can include a conversion unit configured to generate a third two dimensional image based on the depth map, wherein the third two dimensional image comprises a vantage point that is between a first vantage point of the first two dimensional image and a second vantage point of the second two dimensional image.

The techniques, which include both methods and apparatuses, described herein can provide one or more of the following advantages. The techniques provide for quicker, more efficient, and more accurate three dimensional conversion than existing conversion tools by generating an accurate depth map from two dimensional images, and then converting the depth map to a three dimensional image (e.g., via a stereoscopic pair). By color segmenting the two dimensional images and identifying object boundaries based on the color segmented frames, the present systems and methods realize a substantial savings in time over generating boundary information by other means. Additionally, the saturations of each color used to generate the color segmented images can be initially created and adjusted by the user to customize the techniques to a particular set of images (or frames). Further, while the system provides for automatic generation of a Bezier map for objects within color segmented frames, a person can manually adjust the Bezier points (e.g., if the initial color segmentation fails in accuracy or does not produce a desired three dimensional effect).

The systems and methods disclosed herein can not only operate on a two dimensional image, but also on a previously-generated depth map (e.g., by using a larger custom depth range, so the depth information includes more information to determine and/or to distinguish closer and further objects, which results in a more accurate depth map than from a coarsely-grained depth map). Further, human experience data can be used to more accurately convert two dimensional images (e.g., human experience data regarding facial features). Additionally, the first and last two dimensional images (or frames) of a frame sequence can be converted, and then all the two dimensional images between the first and last two dimensional images can be automatically converted based on the first and last images. The last two dimensional image of the sequence can then be set as the first two dimensional image for a second two dimensional image sequence, and the process can be repeated recursively. Additionally, if desired, the systems and methods disclosed herein can edit an automatically converted two dimensional image of the two dimensional image sequence.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

DETAILED DESCRIPTION

In general overview, the techniques described herein provide for automatic color segmentation of two dimensional images (e.g., frames of a motion picture), identification of object boundaries based on the color segmented frames (e.g., a Bezier map, which can be automatically adjusted and then subsequently fine-tuned), generation of an accurate depth map from two dimensional images (e.g., with a custom depth range), and then conversion of the depth map to a three dimensional image (e.g., via a stereoscopic pair). The techniques can operate on any type of two dimensional image, and can also operate on a previously generated depth map (e.g., a depth map lacking the fine-tuned details used by the current techniques).

Figure 1:
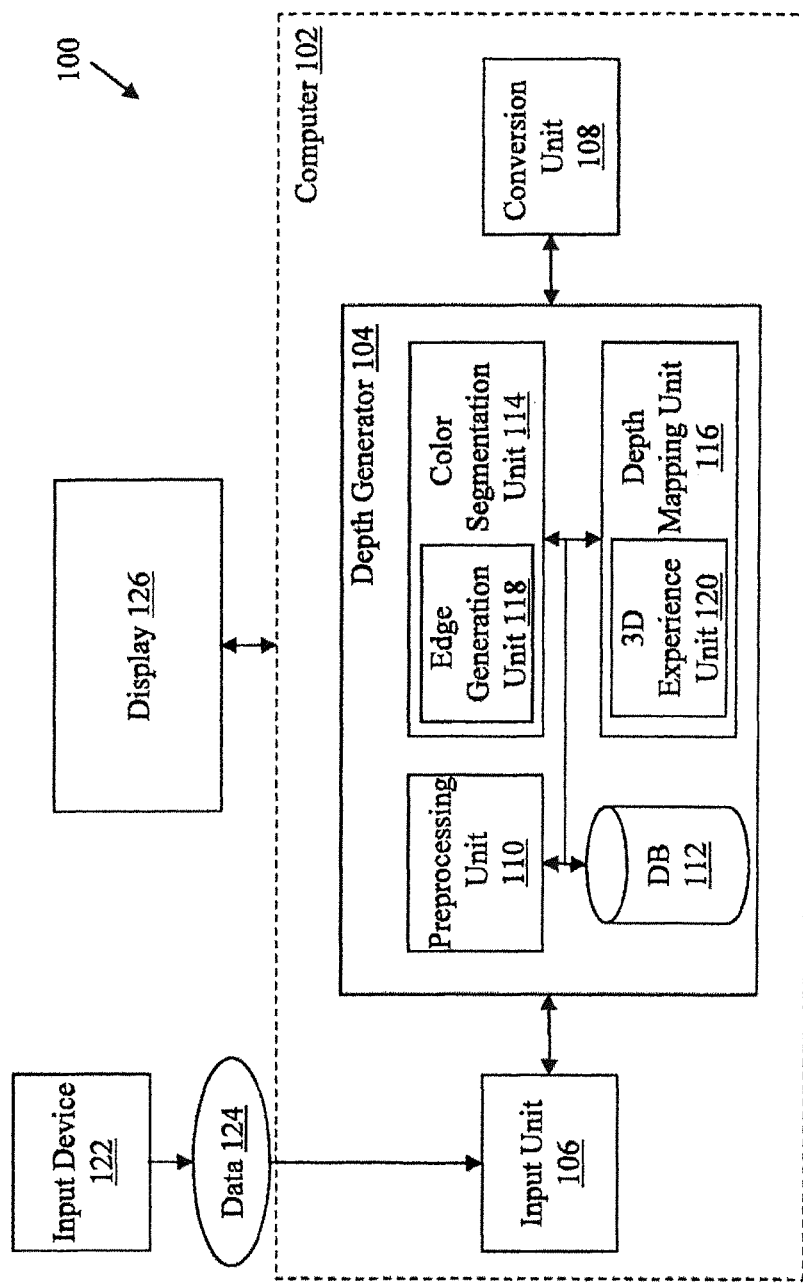
FIG. 1 illustrates an exemplary 3D rendering system according to the present invention.

FIG. 1 illustrates an exemplary 3D rendering system 100 according to the present invention. The 3D rendering system 100 includes computer 102. Computer 102 includes depth generator 104, an input unit 106, and a conversion unit 108. Input unit 106 is in communication with the depth generator 104. Depth generator 104 includes a preprocessing unit 110 and the database 112 (e.g., a data storage device). Depth generator 104 also includes a color segmentation unit 114 and a depth mapping unit 116. The color segmentation unit 114 includes an edge generation unit 118. The depth mapping unit 116 includes a 3D experience unit 120. The various components of the depth generator 104 (e.g., the preprocessing unit 110 through the 3D experience unit 120 of the depth mapping unit 116) are in communication with each other.

The computer 102 is a computing system (e.g., a programmable, processor-based system) specially configured to generate 3D images. The computer 102 may include, for example, a microprocessor, a hard drive (e.g., database 112), random access memory (RAM), read only memory (ROM), input/output (I/O) circuitry, and any other necessary computer components. The computer 102 is preferably adapted for use with various types of storage devices (persistent and removable), such as, for example, a portable drive, magnetic storage (e.g., a floppy disk), solid state storage (e.g., a flash memory card), optical storage (e.g., a compact disc or CD), and/or network/Internet storage. The computer 102 may comprise one or more computers, including, for example, a personal computer (e.g., an IBM-PC compatible computer) or a workstation (e.g., a SUN or Silicon Graphics workstation) operating under a Windows, MS-DOS, UNIX, or other suitable operating system and preferably includes a graphical user interface (GUI).

The depth generator 104 can generate depth maps for 2D images and/or to process and refine previously generated depth maps. For example, the depth generator 104 can import (e.g., via input unit 106, database 112, or through an internet or Ethernet connection (not shown)) a previous depth image and more accurately recalculate and fine-tune the parameters of the depth map. The depth generator 104 can also receive a 2D image with no associated depth map and calculate a depth map for the 2D image without any other additional data. The color segmentation unit 114 can generate a plurality of color segmented images (e.g., for a 2D image), and the depth mapping unit 116 can use the color segmented images to generate the depth map.

The input unit 106 enables information to be communicated to the depth generator 104. For example, the input unit 106 provides an interface for a user to communicate with the 3D rendering system 100 via input device 122 (e.g., the input device 122 can send data 124 to the input unit 106). The terms user and operator both refer to a person using the 3D rendering system 100 and can be used interchangeably. The input device 122 may include any device enabling a user to provide input to a computer. For example, the input device 122 can include a known input device, such as a keyboard, a mouse, a trackball, a touch screen, a touch pad, voice recognition hardware, dials, switches, buttons, a foot pedal, a remote control device, a scanner, a camera, a microphone, and/or a joystick. The input unit 106 can be configured, for example, to receive two dimensional images from the input device 122.

The conversion unit 108 can convert a depth map for a 2D image into a 3D image. In some embodiments, the conversion unit 108 converts a frame sequence (e.g., sequential frames for a motion picture). For example, the depth generator 104 can convert the first and last frames for any given segment of a motion picture, and then automatically convert all the frames in-between the first and last frames. The last frame can then be set as the first frame for a second frame sequence. Additionally, if desired, the depth generator 104 can edit a frame between the first and last frames of a frame sequence.

The edge generation unit 118 is configured to generate edge information for each object in the two dimensional image (e.g., the edge generation unit 118 rotoscopes objects within images, rotoscopes color segmented frames, etc.). While the edge generation unit 118 is shown as a unit within the color segmentation unit 114, this is for exemplary purposes only and the edge generation unit may comprise a unit separate from the color segmentation unit 114.

The three dimensional experience unit 120 is configured to apply one or more experience rules to use when creating and/or adjusting a depth map (e.g., a depth map generated by the depth mapping unit 116). Each rule is configured to adjust the depth map based on human perceptions. For example, the rules can be configured to adjust the depth map based on a human perception of one or more objects in the two dimensional image. In some embodiments, when the depth mapping unit 116 calculates a depth map, the depth mapping unit 116 is configured to applying one or more experience rules to adjust the depth map.

Advantageously, the 3D experience unit 120 can be configured to add in human experience data. Most 3D rendering programs apply the same rules to a particular image when generating a depth map without considering properties of the image (e.g., shadows, light angles, unexpected colors, etc.) or objects within the image itself (e.g., human faces, spheres, etc.). Thus, if an odd shadow is cast by a certain angle of light in a particular image, such programs often interpret the object exactly based on the colors and may improperly render the object due to the odd shadow. This may not always result in a "proper" 3D image that correlates to what a human viewer would perceive when viewing the same objects. Rather than categorically applying rules based on pixel colors, humans do not always perceive an image or object based solely on the colors. Human eyes, unlike programs, have an illusion where the human brain can understand depth even if the shadowing or coloring is "incorrect" (e.g., a nose always protrudes from the human face, regardless if a shadow is cast on the nose such that the pixel information would otherwise indicate the nose sinks inwards). Therefore, automatic 2D-3D conversion does not always result in a proper 3D image due to human illusions.

In some examples, the depth generator 104 can be configured with a "face recognition" illusion which incorporates information on how humans perceive faces. For example, as described above, the face illusion verifies that the nose is always protruding from the human face rather than extending inwards within the human face (e.g., even if the shadows indicate the nose is protruding inwards or otherwise). Rules can be defined in the 3D experience unit 120 to implement the face recognition illusion. In some examples, additional colors can be added to the color segmentation unit 114 for use when segmenting the image. For example, the colors beige and brown can be added because of how many shades of colors exist within the human face. Light and dark pairs can also be used for beige and brown to further fine-tune the color segmentation of human anatomy. Advantageously, a saturation of each color can be initially created and adjusted by the user to adjust the depth generator 104 to a particular set of one or more images. This and other illusions can be built into the system to more accurately define the 2D-3D conversion process.

The input device 122 is in operative communication with the computer 102. For example, the input device 122 may be coupled to the computer 102 via an interface (not shown). The interface can include a physical interface and/or a software interface. The physical interface may be any known interface such as, for example, a wired interface (e.g., serial, USB, Ethernet, CAN bus, and/or other cable communication interface) and/or a wireless interface (e.g., wireless Ethernet, wireless serial, infrared, and/or other wireless communication system). The software interface may be resident on the computer 102 (e.g., in the input unit 106).

The display 126 is a visual interface between the computer 102 and the user. The display 126 is connected to the computer 102 and may be any device suitable for displaying text, images, graphics, 3D images, and/or other visual output. For example, the display 126 may include a standard display screen (e.g., LCD, CRT, plasma, etc.), a touch screen, a wearable display (e.g., eyewear such as glasses or goggles), a projection display, a head-mounted display, a holographic display, and/or any other visual output device. The display 126 may be disposed on or near the computer 102 (e.g., mounted within a cabinet also comprising the computer 102) or may be remote from the computer 102 (e.g., mounted on a wall or other location suitable for viewing by the user). The display 126 may be used to display any information useful for a 3D rendering, such as, for example, depth maps, color segmented images, stereoscopic images, auto-stereoscopic images, etc.

Figure 2:
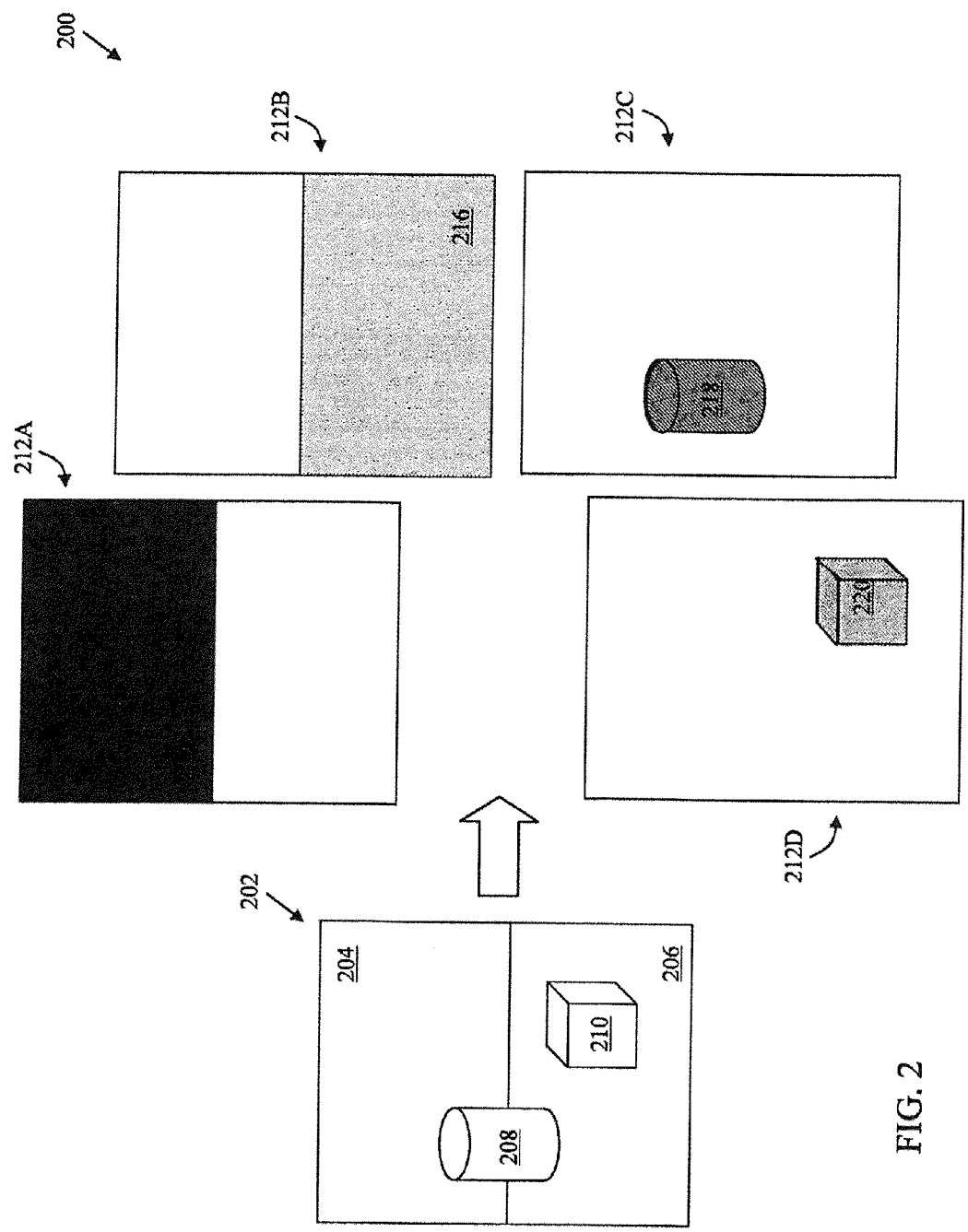
FIG. 2 illustrates an exemplary diagram showing color segmented images derived from an image according to the present invention.

FIG. 2 illustrates an exemplary diagram 200 showing color segmented images derived from an image according to the present invention. Two dimensional image 202 includes a background 204, a foreground 206 (e.g., a table or counter), a first object 208, and a second object 210. Two dimensional image 202 includes simplified objects for illustrative purposes, whereas the methods and systems described herein can process any image regardless of the complexity of the objects within the image. The diagram 200 includes four color segmented frames, 212A-212D (collectively, color segmented frames 212). Color segmented frame 212A includes a color segmented object 214 for the background 204. For example, the color used to generate the color segmentation image 212A includes a color value (e.g., RGB or HLS color space) range that captures the entire background 204 of the two dimensional image 202, which is represented as the one color segmented object 214. Similarly, color segmented frame 212B includes color segmented object 216 for the foreground 206, color segmented frame 212C includes color segmented object 218 for the first object 208, and color segmented frame 212D includes color segmented object 220 for the second object 210.

As will be explained below, the depth generator 104 can automatically rotoscope the two dimensional image 202 based on the color segmented frames 212. Keys can be pulled from each of the color segmented frames 212. A key represents each color used during the color segmented process. For example, a green key can represent a particular range of color values in the green color spectrum (e.g., for a tree with green leaves, depending on the color value range associated with the green key, particular portions of the green leaves with green colors that fall within the green color value range are captured for the green key). The key for color segmented frame 212D can be, for example, representative of the outline of the color segmented object 220, which is automatically rotoscoped by the depth generator 104 to derive the key. As will be described in more detail below, the color segmented object 220 can be rotoscoped by employing a combination of Bezier points on the line surrounding the color segmented object 220 and then fine-tuning the Bezier maps to more accurately fit the color segmented object 220 (if necessary). In some examples, in the area rotoscoped, the user can adjust the depth information so the depth map for the image can be calculated for each object in the image individually (e.g., for the first object 208 and the second object 210). Advantageously, a person can manually adjust the Bezier points of a Bezier map after the depth generator 104 automatically rotoscopes the two dimensional image 202 if, for example, the initial color segmentation fails in accuracy or does not produce a desired effect (e.g., an improper 3D effect).

Figure 3:
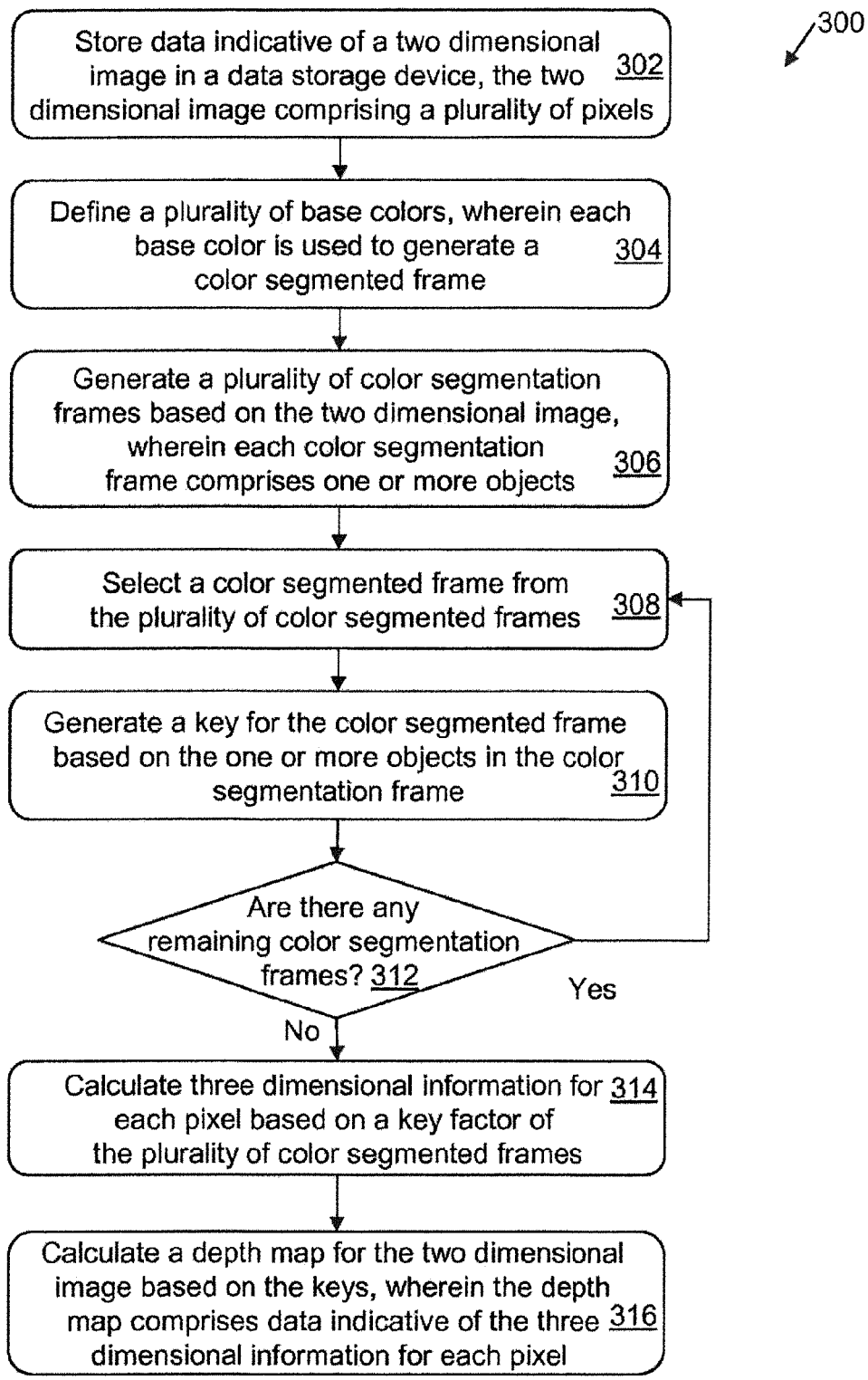
FIG. 3 illustrates an exemplary method for pulling keys from color segmented images according to the present invention.

FIG. 3 illustrates an exemplary method 300 for pulling keys from color segmented images (e.g., the two dimensional image 202 of FIG. 2, which is color segmented into the color segmented frames 212) according to the present invention. At step 302, the depth generator 104 stores data indicative of a two dimensional image (e.g., the two dimensional image 202) in a data storage device (e.g., database 112), the two dimensional image comprising a plurality of pixels. At step 304, the depth generator 104 receives information to define a plurality of base colors, wherein each base color is used to generate a color segmented frame (e.g., is used to generate one of the color segmented frames 212). At step 306, the depth generator 104 generates (e.g., by color segmentation unit 114) a plurality of color segmented frames based on the two dimensional image, wherein each color segmented frame comprises one or more objects (e.g., the color segmented frames 212).

At step 308, the depth generator 104 selects a color segmented frame from the plurality of color segmented frames. At step 310, the depth generator 104 generates (e.g., by the color segmentation unit), for each of the color segmented frames, a key based on the one or more objects. At step 312, the depth generator 104 determines whether there are any remaining color segmentation frames. If there are remaining color segmentation frames, the method 300 loops back to step 308. If there are no remaining color segmentation frames, the method 300 continues to step 314. At step 314, the depth generator 104 calculates three dimensional information for each pixel based on a key factor of the plurality of color segmented frames. At step 316, the depth generator 104 calculates (e.g., by the depth mapping unit 116) a depth map for the two dimensional image based on the keys, wherein the depth map comprises data indicative of three dimensional information for each pixel of the two dimensional image.

With respect to step 302, in some embodiments the depth generator 104 receives (e.g., via the input unit 106) data indicative of the two dimensional image and stores the data in the data storage device (e.g., database 112). In some embodiments, the depth generator 104 can be configured to receive data indicative of a previously generate depth map and to store the data indicative of the previously generate depth map in the data storage device.

With respect to step 304, the color segmentation unit can be configured to store a predefined number of base colors, wherein each of the predefined colors are used to generate the color segmented frames. As described above with reference to the 3D experience unit 102 of FIG. 1, the base colors can include colors such as yellow, cyan, magenta, red, green, beige, brown, blue, etc. Additionally, in some embodiments color pairs can be used for each base color that includes a light color and a dark color for each base color (e.g., as dark red and light red, dark beige and light beige, etc.). For each base color or color from a color pair (referred to collectively as color), the color can include a predefined range of color values (e.g., RGB or HLS color space). The color ranges can be used when analyzing pixels to determine whether or not a pixel color falls within the color. If a pixel of the image has a color value within the predefined range of color values, then that pixel is associated with the color segmented frame generated based on the base color. For example, assume base color "light red" has a range of R=128-255, G=0-95, B=0-95, and base color "dark red" has a range of R=64-127, G=0-95, B=0-95. An area which has color values that fall within the range of R=128-255, G=0-95, B=0-95 is associated with the base color "light red." If an area has color values that fall within the range of R=100-150, G=0-95, B=0-95, the area is associated with a set of the "light red" and "dark red" base colors. In some embodiments, the range values of the base color are adjusted automatically to cover whole area corresponding to one object which has a similar color.

The depth generator 104 can be configured to allow the color value range associated with each base color to be adjusted (e.g., based on data received from a user). The color segmentation unit 114 can be configured to receive data indicative of a new range of color values for one or more colors of the plurality of base colors, and to adjust the predefined range of color values for each of the one or more colors based on the data. Advantageously, if a particular image includes mostly one color (e.g., various shades of green), the color values can be adjusted to distinguish between the various shades of green so the color segmentation unit 114 generates multiple color segmented frames. Otherwise, because the image is mostly composed of green shades, using default values the color segmentation unit 114 may generate fewer color segmented frames because the color value ranges are too large to finely distinguish between the shades of green.

With respect to step 306, and with reference to FIG. 2, the depth generator 104 generates a color segmented frames 212 based on the two dimensional image 202. Each color segmented frame 212 comprises one or more objects (e.g., color segmented image 212D includes color segmented object 220).

Figure 4:
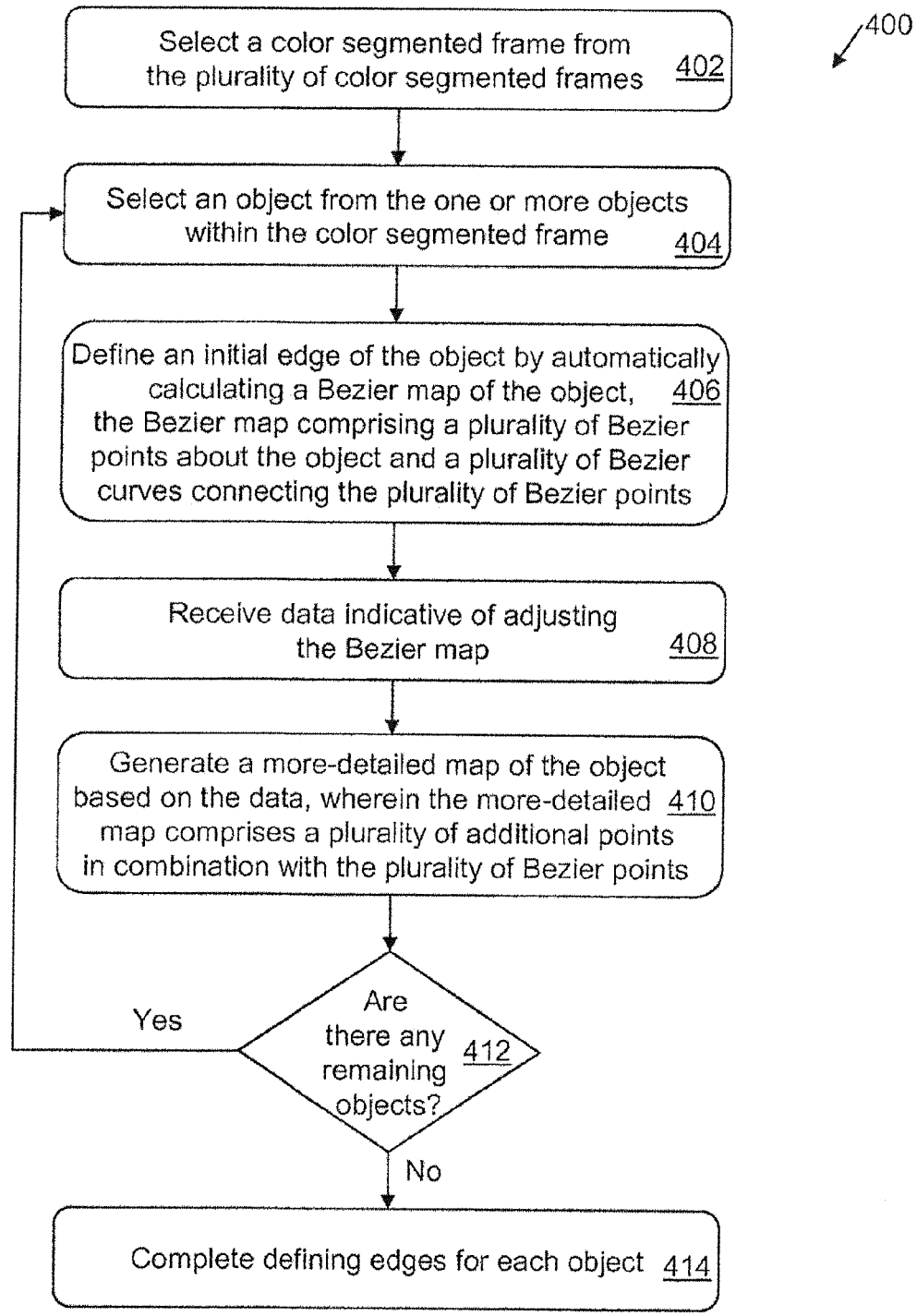
FIG. 4 illustrates an exemplary method for defining edges of an object within an image according to the present invention.

With respect to step 310, the depth generator 104 generates a key for each color segmented frame based on the one or more objects within the color segmented frame. As mentioned above, a key for color segmented frame is representative of the objects within a particular color segmented frame. FIG. 4 illustrates an exemplary method 400 for defining edges of an object within an image according to the present invention. At step 402, the edge generation unit 118 selects a color segmented frame from the plurality of color segmented frames 112. At step 404, the edge generation unit selects an object from the one or more objects within the color segmented frame (e.g., color segmented object 218 within color segmented frame 212C). At step 406, the edge generation unit 110 automatically calculates a Bezier map of the selected object. The Bezier map includes a plurality of Bezier points about the object and a plurality of Bezier curves connecting the plurality of Bezier points. The Bezier map can be an initial starting-point for generating the edges of each object. At step 408, the edge generation unit 118 receives data indicative of adjusting the Bezier map. For example, a user may want to add additional points about an object to more accurately define the curves around the object. At step 410, the edge generation unit 118 generates a more-detailed map of the object based on the data, wherein the more-detailed map comprises a plurality of additional points in combination with the plurality of Bezier points.

At step 412, the edge generation unit 118 determines whether there are any remaining objects within the selected color segmented frame. If the edge generation unit 118 determines there are additional objects, the method 400 continues back to step 404. if the edge generation unit 118 determines there are no additional objects within the selected color segmented frame, the method 400 continues to step 414. At step 414, the edge generation unit completes defining edges for each object within the selected image. The method 400 is performed for each color segmented frame from the plurality of color segmented frames. Advantageously, in some embodiments, an initial Bezier map can be used for efficiency and to provide a user with a starting point for defining the boundaries of an object, and the user can then subsequently fine-tune the edge map of the object.

With respect to step 314, the depth generator 104 calculates three dimensional information for each pixel based on a key factor of the plurality of color segmented frames. Generally, depth maps are thought of as black and white images, however the present systems and methods include more data for each pixel by using a custom depth range. For example, a custom depth range of 0 to 65,280 can be used for each pixel to fine-grain the depth information (e.g., a pixel with a depth range of 0 is the farthest depth value to the viewer while a pixel with a depth range of 65,280 is the nearest depth value from the viewer). For example, conventional RGB values (e.g., from 0 to 255) can be converted to the custom depth range by using predetermined equations (e.g., configured through the depth mapping unit 116). Advantageously, by using the larger custom depth range, the depth information includes more information to determine and/or to distinguish closer and further objects, which results in a more accurate depth map than from a coarsely-grained 0 to 255 range depth map. On some embodiments, conversion to the custom depth range can be achieved with the equation: depth=G×B+R. In these embodiments, max depth is 65,280=255×255+255. Advantageously, by using such a conversion, the present systems and methods can easily compare the custom depth value with the original pixel data.

In some embodiments, the key factor includes the HLS color space (hue (H), saturation (S), and lightness (L)) of the pixel. The three dimensional information for each pixel can be calculated by determining the level of saturation, the level of lightness, and/or the like and assigning a depth value to the pixel based on the determination. For example, the ranges are set for H=0-360, L=0-100, S=0-100, if the pixel has a high level of saturation or lightness (e.g., S=60-100, L=30-100), then the depth generator 104 assigns the pixel a near depth value (e.g., 200 (if the depth range is set for 0-255)). Similarly, for example, if the pixel has a low level of saturation or lightness (e.g., S=0-60, L=0-30), then the depth generator 104 assigns the pixel a far depth value (e.g., 50 (if the depth range is set for 0-255)).

In some embodiments, the key factor includes an amount of value change among the pixel and a group of neighboring pixels. For example, the amount of value change is a change in saturation between the pixel and the surrounding pixels. For example, the depth generator 104 determines, based on the value change, whether the pixel is part of a flat plane (e.g., a wall, a table top). If the depth generator 104 determines that the pixel is part of the flat plane, the depth generator 104 assigns the pixel a far depth value.

In some embodiments, the key factor includes a position of each of the one or more objects in each color segmented frame. The position of the object can be an absolute position (e.g., the object is located on the lower half of a color segmented frame), or the position can be a relative position (e.g., the object is located below another object within the color segmented frame). For example, referencing FIG. 2, the position of the color segmented object 220 can be described as being located in the lower half of the color segmented frame 212D, the position of the color segmented object 220 can be described as being located below another object in the color segmented frame 212D (not shown), and/or the like. The depth generator 104 can assign depth values for pixels of the object based on the associated location data. For example, if the position of the object is a lower position of the color segmented frame (e.g., on the lower half of a color segmented frame 212D or below another object), the depth generator 104 assigns each pixel within the object (e.g., each pixel of the color segmented object 220) a near depth value (e.g., 200 (if the depth range is set for 0-255)).

If the position of the object is an upper position of the color segmented frame (e.g., the color segmented object 218 is on the upper half of color segmented frame 212C, or the color segmented object 218 is above a second object (not shown)), the depth generator 104 assigns each pixel within the object a far depth value (e.g., 50 (if the depth range is set for 0-255)). The depth value can be assigned any range. If the range is set for 0-255, the farthest depth value is set to zero and the nearest depth value is set to 255. If the range is set for 0-65,280, the farthest depth value is set to zero and the nearest depth value is set to 65,280. If, for example, the position of the object is within a corresponding object of another color segmented frame (e.g., if when color segmented frames 212C and 212D are superimposed, color segmented object 220 in color segmented frame 212D is superimposed onto a color segmented object in color segmented frame 212C (not shown) that is larger than and extends about color segmented object 220), the depth generator 104 assigns each pixel within the object (i.e., color segmented object 220) a near depth value. If, for example, the position of the object is at an edge portion of the color segmented frame (e.g., color segmented object 216 is at an edge portion of color segmented frame 212B), the depth generator 104 assigns each pixel within the object (e.g., color segmented object 216) a far depth value.

In some embodiments, the key factor includes a ratio of a size of each of the one or more objects in each color segmented frame to a size of the color segmented frame. For example, a ratio can be calculated of the pixel size of color segmented object 220 to the total pixel size of the color segmented frame 212D. If, for example, the pixel size of the color segmented object 220 is 62,500 pixels and the total pixel size of the color segmented frame 212D is 2,073,600 pixels (i.e., 1080×1920), then the ratio would be 62,500/2,073,600=0.030. The depth generator 104 can, for each object, assign a depth value to each pixel within the object based on the ratio (e.g., depth value=100 (for a ratio between 0.01 to 0.1), 150 (for a ratio between 0.1 to 0.2), 200 (for a ratio between 0.2 to 0.5), or 255 (for a ratio between 0.5 to 1.0) (if the depth range is set for 0-255)).

In some embodiments, the key factor includes information indicative of a position of an object in the two dimensional image and a position of a corresponding object in a serial two dimensional image. For example, this position information can be used to determine motion of the object between serial two dimensional images (e.g., if a car is moving from left to right, then when comparing two serial images, the car will be located further right in the second serial image, which is the image taken later in time). The depth generator 104 can determine the position of the object in the two dimensional image is different than the position of the corresponding object in the serial two dimensional image (e.g., based on the relative positions of the corresponding color segmented objects in the color segmented frames that contain the color segmented objects for each two dimensional image), and assign each pixel within the color segmented object of the first two dimensional frame a near depth value (e.g., 200 (if the depth range is set for 0-255)). It should be understood that the various embodiments described above can be combined and need not be used separately (e.g., hue, saturation, and lightness of the pixel can be used in conjunction with the position of the color segmented objects, etc.).

With respect to step 316, the depth generator 104 calculates (e.g., by the depth mapping unit 116) a depth map for the two dimensional image based on the keys. The depth map comprises data indicative of the three dimensional information for each pixel of the two dimensional image. As described above, the depth map has increased depth information for the objects within the two dimensional image (i.e., because the depth map comprises a custom depth range for each pixel, which increases the accurateness of the depth map).

Figure 5:
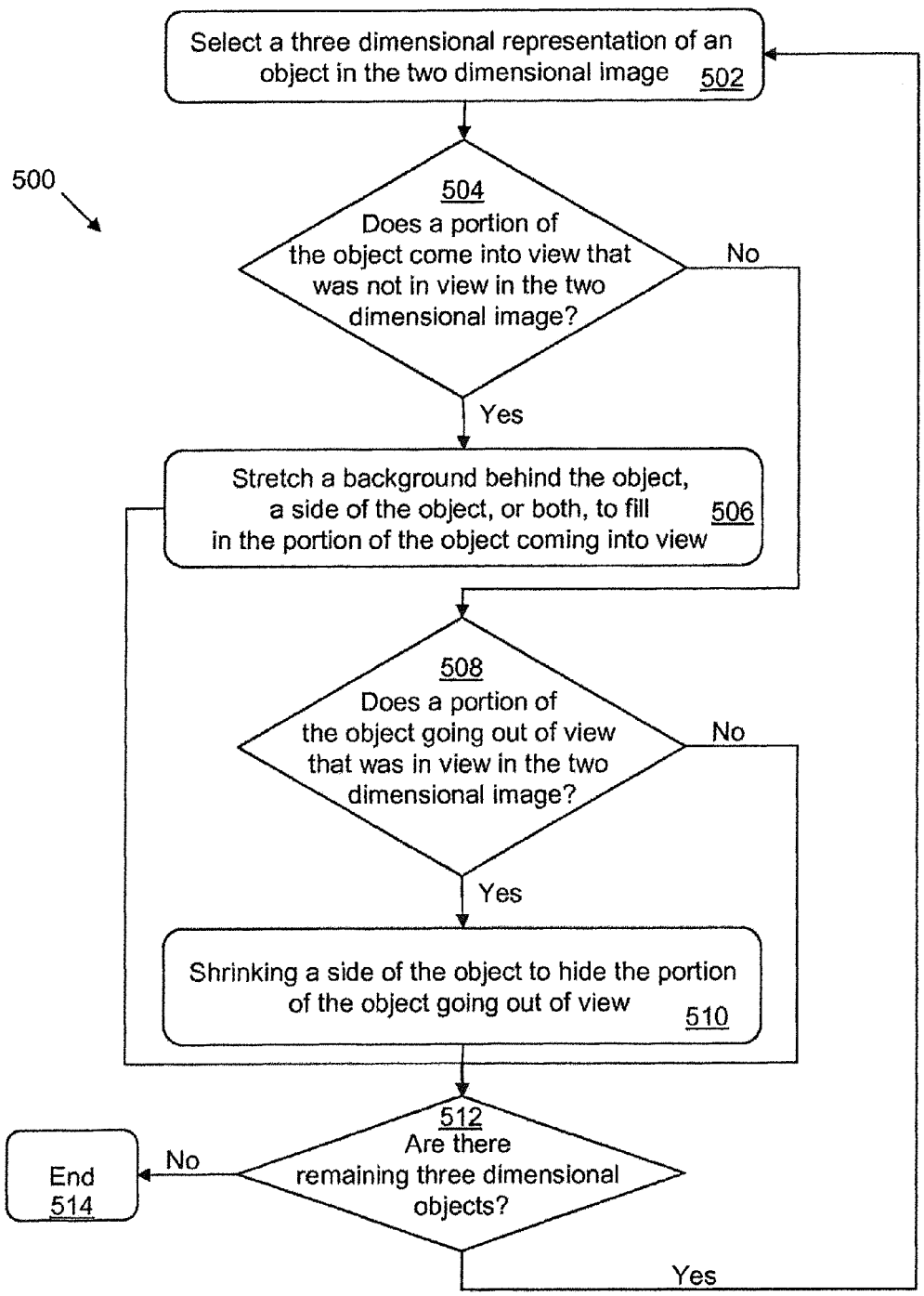
FIG. 5 illustrates an exemplary method for manipulating objects according to the present invention.

In some examples, a three dimensional representation of an object (e.g., via stereoscopic pairs) in the two dimensional image may cause the object to either come into view and/or go out of view when the depth generator 104 processes the two dimensional image (e.g., if the left image of the stereoscopic pair remains the same, since the right image is depicted from a different vantage point than the left image, portions of objects in the right image may come into and/or go out of view). The depth generator 104 may need to adjust the depth map to account for these scenarios. FIG. 5 illustrates an exemplary method 500 for manipulating objects according to the present invention. At step 502, the depth generator 104 selects a three dimensional representation of an object in the two dimensional image (e.g., a three dimensional representation of first object 208 of two dimensional image 202 of FIG. 2).

At step 504, the depth generator 104 determines whether a three dimensional representation of an object in the two dimensional image results in a portion of the object coming in view that was not in view in the two dimensional image. For example, the depth generator 104 may determine that a portion of the side of first object 208 that is not visible in the two dimensional image 202 will come into view when the three dimensional image (or image for a stereoscopic pair) is rendered. If the depth generator 104 makes such a determination, then the method 500 proceeds to step 506, where the depth generator 104 stretches the background behind the object, stretches the side of the object that will come into view, or a combination of both, to fill in the portion of the object coming into view. For example, if the right side of the first object 208 is coming into view, the depth generator 104 can stretch a portion of the right side of the first object 208 (and/or stretch a portion of the background 204 and foreground 206 that are adjacent to the right side of the first object 208) to fill in the gap that would otherwise exist at the right side of the first object 208.

If the depth generator 104 does not make such a determination at step 504, then the method 500 proceeds to step 508 and determines whether a three dimensional representation of an object in the two dimensional image results in a portion of the object going out of view that was in view in the two dimensional image. If the depth generator 104 makes such a determination, the method 500 proceeds to step 510 and the depth generator 104 shrinks a side of the object to hide the portion of the object going out of view. For example, if the left side of the first object 208 is going out of view, the depth generator 104 can shrink a portion of the left side of the first object 208 to compensate for the missing portion of the left side of the first object 208.

If the method does not make such a determination at step 508, the method proceeds to step 512, where the depth generator 104 determines whether there are any remaining three dimensional objects to analyze. If there are remaining objects, the method proceeds back to step 502 by selecting one of the remaining objects. Otherwise, the method proceeds to step 514 and terminates since all three dimensional objects have been analyzed and processed if necessary (according to steps 504 through 510).

When the depth generator 104 calculates the depth map for the two dimensional image based on the keys, the depth generator 104 can fine-tune a previously generated depth map. The depth generator 104 stores (e.g., via database 112) data indicative of a previously generated depth map. The previously generated depth map includes data indicative of three dimensional information for each pixel of the two dimensional image that corresponds to the depth map (e.g., the depth map includes a depth range from 0 to 255 for each pixel). The depth generator 104 can generate a new depth map based on the previously generate depth map, wherein the new depth map comprises data indicative of a larger range of three dimensional information for each pixel of a corresponding two dimensional image (e.g., a range between 0 and 65,280 as described above). Advantageously, the systems and methods described herein can fine-tune a previously generated depth map quickly and efficiently based only on the previously generated depth map (e.g., via the equation depth=G×B+R, as described above).

Figure 6:
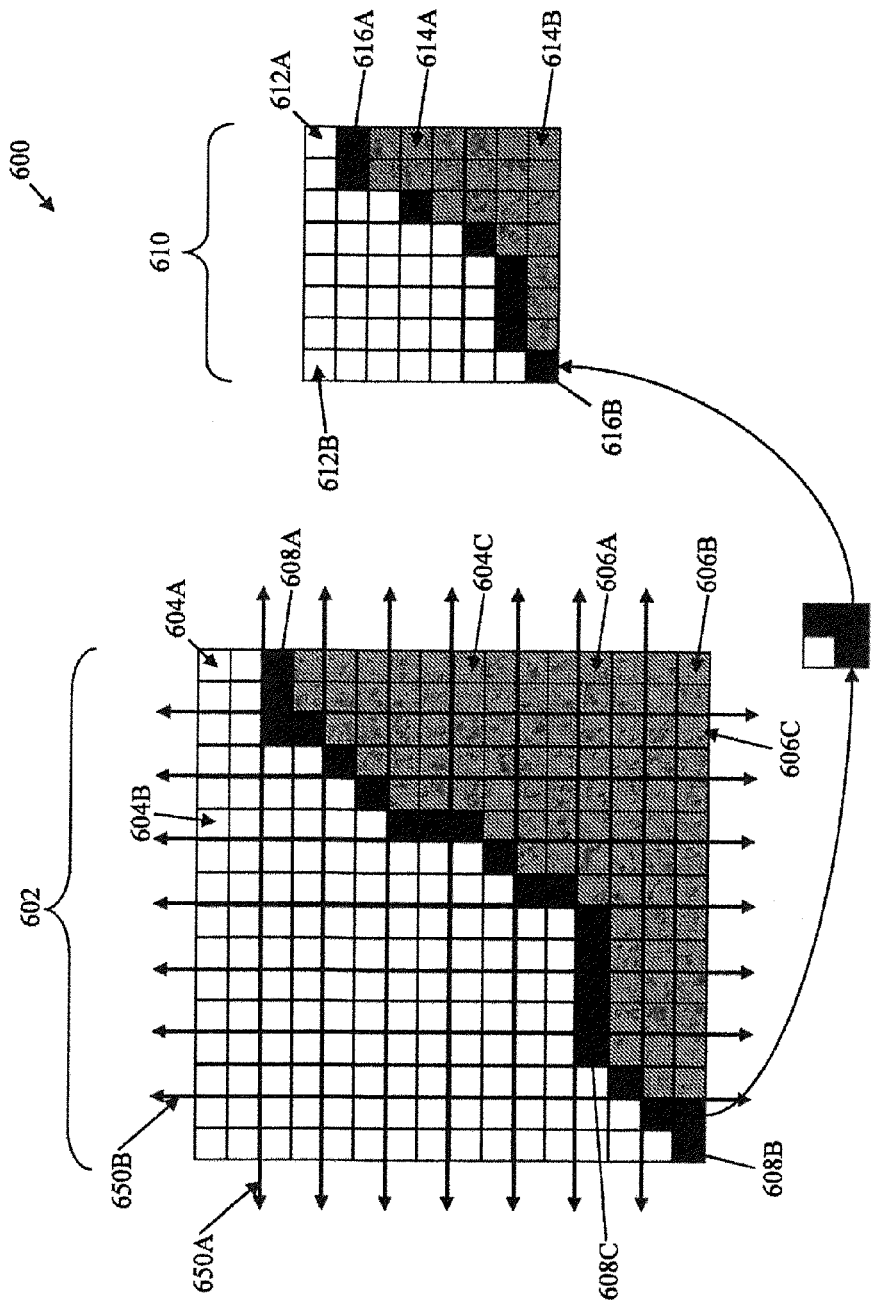
FIG. 6 illustrates an exemplary diagram showing image manipulation according to the present invention.

FIG. 6 illustrates an exemplary diagram 600 showing image manipulation according to the present invention. Two dimensional image 602 comprises a plurality of pixels 604A, 604B, 604C (collectively pixels 604). The pixel size of the two dimensional image 602 is the product of the length of pixels of the image along a vertical side of the two dimensional image 602 (e.g., the left side of the two dimensional image 602) and the width of the pixels of the image along a horizontal side of the two dimensional image 602 (e.g., the bottom side of the two dimensional image 602). Two dimensional image 602 comprises object pixels 606A, 606B and 606C (collectively object pixels 606) representative of an object in the two dimensional image 602. Two dimensional image 602 comprises boundary pixels 608A, 608B and 608C (collectively boundary pixels 608) that are along the boundary of the object represented by object pixels 606. Reduced pixel image 610 comprises a plurality of pixels 612A, 612B (collectively pixels 612). Reduced pixel image 610 comprises object pixels 614A, 614B (collectively object pixels 614) representative of an object in the reduced pixel image 610 that corresponds to the object in two dimensional image 602 represented by object pixels 606. Reduced pixel image 610 comprises boundary pixels 616A, 616B (collectively boundary pixels 616) that are along the boundary of the object represented by object pixels 614.

Figure 7:
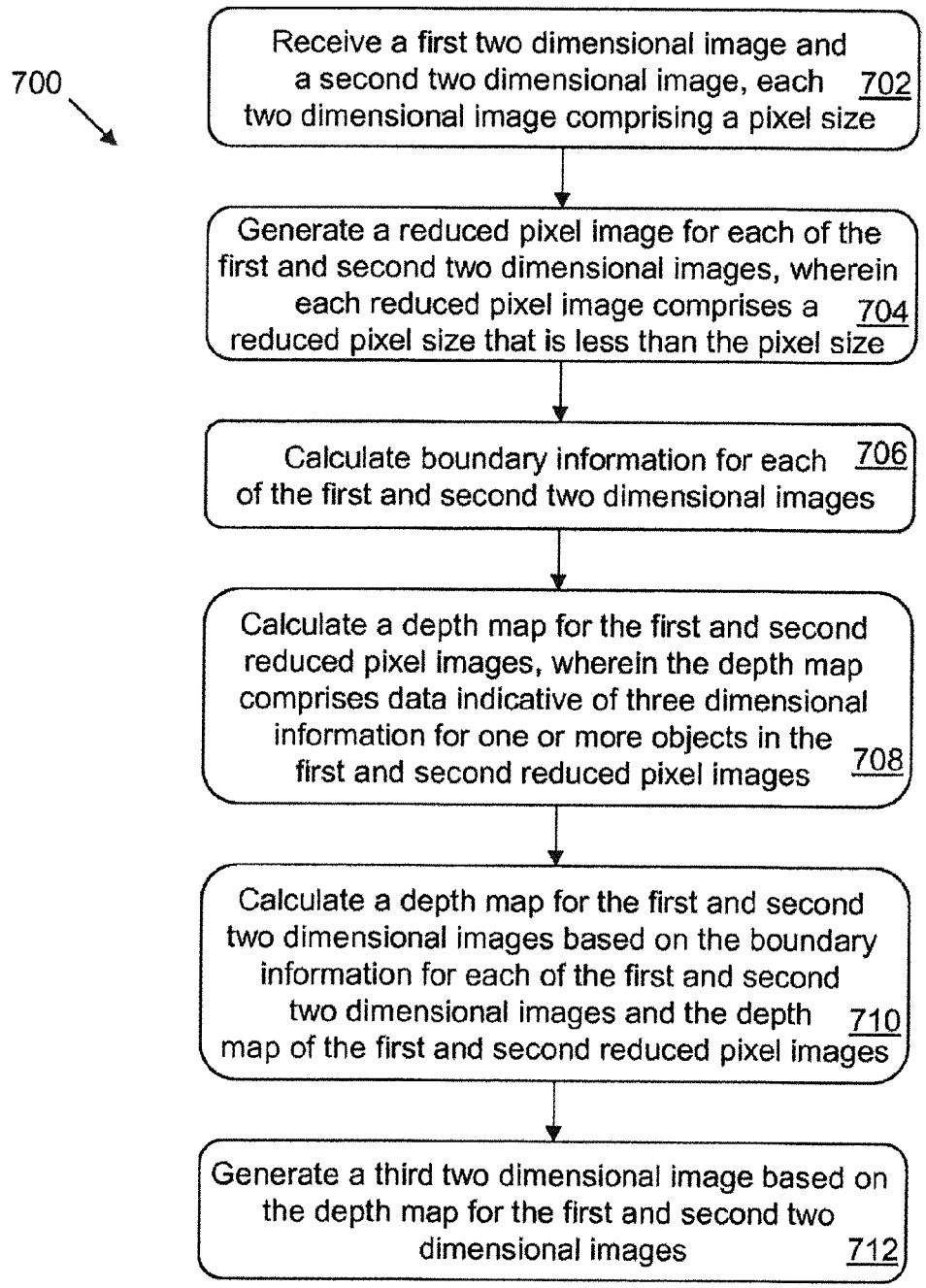
FIG. 7 illustrates an exemplary method for auto-stereoscopic interpolation according to the present invention.

FIG. 7 illustrates an exemplary method 700 for auto-stereoscopic interpolation according to the present invention. Referencing FIG. 1, at step 702 the input unit 106 receives a first two dimensional image and a second two dimensional image, each two dimensional image comprising a pixel size. At step 704, the preprocessing unit 110 generates a reduced pixel image for each of the first and second two dimensional images, wherein each reduced pixel image comprises a reduced pixel size that is less than the pixel size. At step 706, the preprocessing unit 110 calculates boundary information for each of the first and second two dimensional images. At step 708, the depth map unit 116 calculates a depth map for the first and second reduced pixel images, wherein the depth map comprises data indicative of three dimensional information for one or more objects in the first and second reduced pixel images. At step 710, the depth map unit 116 calculates a depth map for the first and second two dimensional images based on the boundary information for each of the first and second two dimensional images and the depth map of the first and second reduced pixel images. At step 712, the conversion unit 108 interpolates frames between the first and second images by generating a third two dimensional image based on the depth map for the first and second two dimensional images, wherein the third two dimensional image comprises a vantage point that is between a first vantage point of the first two dimensional image and a second vantage point of the second two dimensional image.

Referring to step 702, the input unit 106 receives a left image (the first two dimensional image) and a right image (the second two dimensional image). The left and right images are two different perspectives of the same scene (e.g., objects, landscape, etc.). The input unit 106 receives each two dimensional image at an original pixel size. Referring to step 704, the preprocessing unit 110 generates a reduced pixel image for each of the left and right images. Each reduced pixel image comprises a reduced pixel size that is less than the original pixel size of the left and right images. For example, as shown in FIG. 6, the preprocessing unit 110 generates the reduced pixel image 610 based on the two dimensional image 602. Reduced pixel image 610 is a representation of two dimensional image 602 with fewer pixels. For example, the arrows 650A, 650B (collectively arrows 650) that are overlaid over two dimensional image 602 divide the two dimensional image 602 into squares that comprise four pixels. When the preprocessing unit 110 translates the two dimensional image 602 to the reduced pixel image 610, the pixel 612 of the reduced pixel image 610 is set to the dominant pixel within the group of four pixels. For example, the square of the two dimensional image 602 that includes edge pixel 608B is translated to edge pixel 616B of the reduced pixel image 610 because three out of the four pixels in the corresponding square of the two dimensional image 602 are edge pixels.

The two dimensional image 602 and the reduced pixel image 610 are used for illustrative purposes only, as the translation from a two dimensional image to a reduced pixel image can be performed using different translation techniques (e.g., mapping more/fewer pixels in each two dimensional image to a corresponding pixel in the reduced pixel image, mapping multiple pixels in each two dimensional image to multiple pixels in the reduced pixel image, etc.). Additionally, the size of the reduced pixel image the preprocessing unit 110 generates can be adjusted (e.g., 100 pixels by 100 pixels, 100 pixels by 200 pixels, etc.). Each left and right image can be reduced because each image may have pixels the other may not have (e.g., due to the view point of the image). For example, as described above, only one side of an object in the left and right images may be visible from one angle, there may be a hidden point, and/or the like.

Referring to step 706, the preprocessing unit 110 calculates boundary information for each of the left and right images. During this step, the depth generator 102 determines which points (e.g., one or more points) in the left and right images are more likely to be important points (i.e., object boundaries) for ultimately generating the depth map between the left and right images (e.g., at steps 708 and 710). The preprocessing unit 110 can calculate the edge information for the left and right images, and use the edge information to determine a common point for the stereoscopic images. A common point provides a point of reference for comparing the left and right images. For example, the preprocessing unit 110 can determine a common point between the left and right images to be a pixel located on the side of an object in the image (e.g., pixel 608C of the two dimensional image 602). Advantageously, by finding a common point between the left and right images, the preprocessing unit 110 does not need to match multiple points in the left and right images.

In some embodiments, the edge point is selected based on color segmented frames generated from the left and right images, and not the original left and right images (e.g., the color segmentation unit 114 generates multiple color segmented frames of the left and right images for each color used in the color segmentation process as described above). Therefore, the color segmented images can be used to determine object boundaries. For each pixel, the edge generation unit 118 determines whether the pixel is a boundary point or not, and generates the set of pixels that comprise the boundary information (e.g., boundary pixels 608). Advantageously, by performing color segmentation and identifying the boundaries based on the color segmented frames, the present systems and methods realize a substantial savings in time over generating boundary information by other means.

Referring to step 708, the depth map unit 116 calculates a depth map for the first and second reduced pixel images. As described with reference to FIG. 8 below, the depth map unit 116 can calculate information on the difference in pixel locations in the reduced pixel images when generating the depth map. Referring to step 710, the depth map of the left and right images is calculated based on the boundary information for each of the two left and right images (the boundary information generated at step 706) and the depth map for the reduced pixel images (the depth map generated at step 708). For example, in some embodiments the depth value of each boundary pixel (e.g., boundary pixels 608 of two dimensional image 602) is calculated the based on the depth value corresponding to the left and right reduced pixel images (e.g., based on depth values for boundary pixels 616 of reduced pixel image 610). In some embodiments, depth information of the depth map for remaining pixels (i.e., pixels that are not boundary pixels) is determined based on averaged and/or the typical value of the depth map of the reduced pixel images (e.g., determined based on data near corresponding boundary pixels of the left and right reduced pixel images).

Referring to steps 708 and 710, the depth generator 104 (i.e., the depth mapping unit 116) can identify pixel for an object that is visible in one image but not visible in the other image. For example, if an object in the left image includes a pixel that is on the outermost left side of an object, the pixel may not be visible in the right image. This is because, due to the vantage point angle difference between the two images, the outermost pixel on the left side of the object moves out of view when looking at the object from the vantage point of the right image. Similarly, for example, a pixel on the rightmost side of the object may come into view in the left image (i.e., become visible) that is not visible when viewing the object from the vantage point of the left image. Therefore, the conversion unit 108 can generate (or interpolate) a third two dimensional image based on the depth map for the left and right two dimensional images that includes an area that either comes into view (i.e., a pixel that is not visible in the left image but is visible in the right image) or an area going out of view (i.e., a pixel that is visible in the left image but not visible in the right image) based on the identified hidden pixel.

Referring to step 712, the conversion unit 108 interpolates frames between the left and right images. For exemplary purposes, assume that the left image is taken at a vantage point with a reference angle of 0 degrees, and the right image is taken from a vantage point of 2 degrees (in actuality, any applicable range of angles can be used). Therefore, by generating the depth map for the left and right two dimensional images, the conversion unit 108 can now generate an image from a vantage point between the vantage points of the left and right images (e.g., between 0 degrees and 2 degrees). For example, the conversion unit 108 can generate a third two dimensional image based on the depth map for the left and right two dimensional images that has a vantage point of 0.5 degrees, 0.53 degrees, 0.1 degrees, etc.

Figure 8:
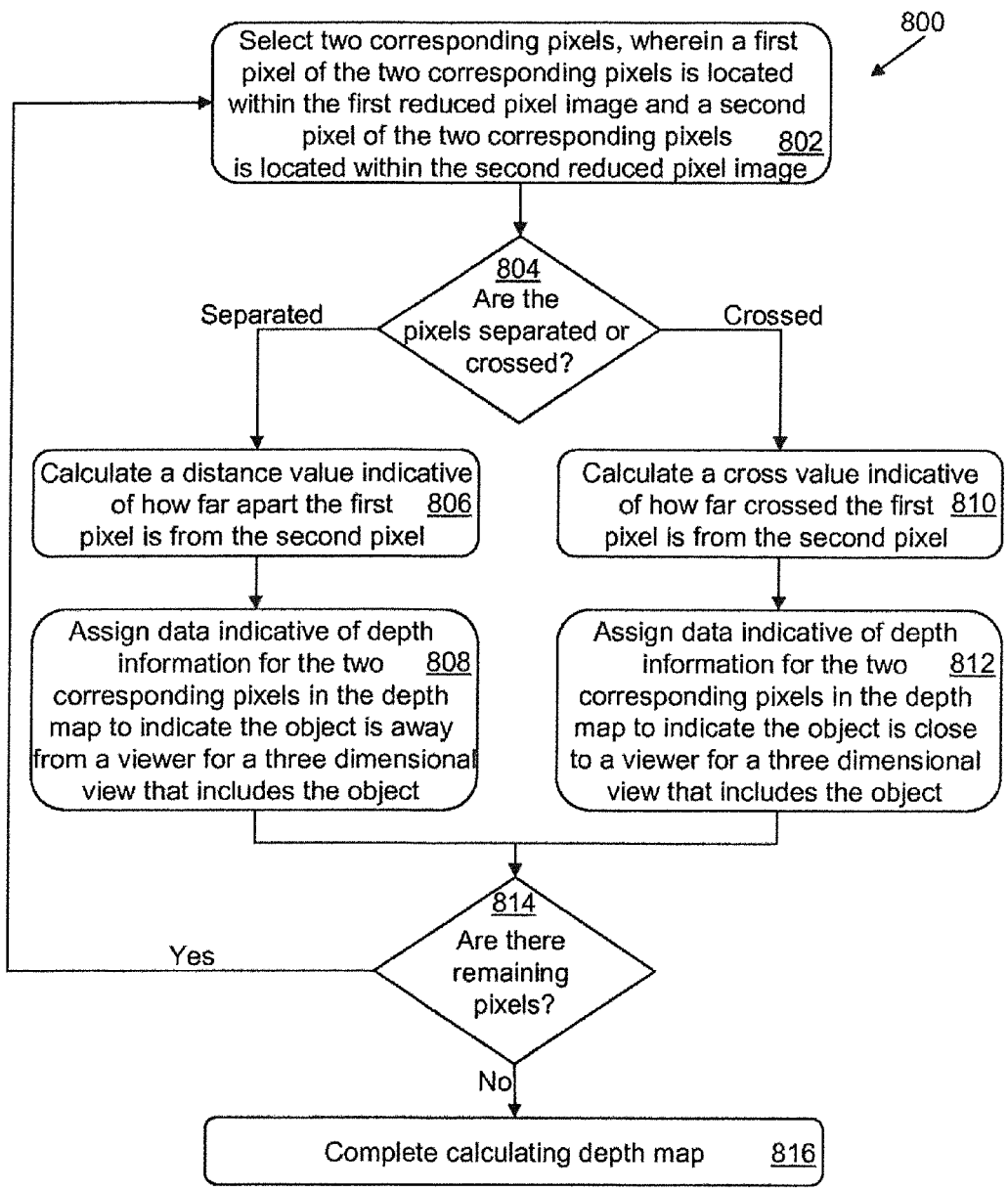
FIG. 8 illustrates an exemplary method for assigning depth information according to the present invention.

FIG. 8 illustrates an exemplary method 800 for assigning depth information according to the present invention, where data for the depth map (e.g., the depth map of the left and right reduced pixel images) is calculated based on the difference in pixel locations (e.g., the difference in pixel locations for each of the objects in the reduced pixel images). At step 802, the depth generator 104 (e.g., via the depth mapping unit 116) compares two corresponding pixels, wherein a first pixel of the two corresponding pixels is located within the first reduced pixel image (e.g., the reduced pixel image for left image) and a second pixel of the two corresponding pixels is located within the second reduced pixel image (e.g., the reduced pixel image for the right image). At step 804, the depth generator 104 determines whether the two pixels are separated or crossed. If the pixels are separated (e.g., when the left and right image are superimposed, the corresponding pixel for the left image is located to the left and the corresponding pixel for the right image is located a distance to the right of the pixel of the left image), the method 800 proceeds to step 806, where the depth generator 104 calculates a distance value indicative of how far apart the first pixel of the left image is from the second pixel of the right image. At step 808, the depth generator 104 assigns data indicative of depth information for the two corresponding pixels in the depth map to indicate the object is away from a viewer for a three dimensional view that includes the object.

If, at step 804 the depth generator 104 determines the pixels are crossed (e.g., when the left and right image are superimposed, the corresponding pixel for the left image is located to the right and the corresponding pixel for the right image is located a distance to the left of the pixel of the left image), the method 800 proceeds to step 810 and the depth generator 104 calculates a cross value indicative of how far crossed the left pixel is from the right pixel (e.g., the distance between the left and right pixels). At step 812, the depth generator 104 assigns data indicative of depth information for the two corresponding pixels in the depth map to indicate the object is close to a viewer for a three dimensional view that includes the object. Both steps 808 and 812 proceed to step 814, where the depth generator 104 determines whether there are any remaining pixels (e.g., any pixels of the left and right reduced pixel images) that have not been calculated yet. If there are remaining pixels, the method 800 proceeds back to step 802. Otherwise, the method proceeds to step 816 and the depth generator 104 completes calculating the depth map 816.

Figure 9:
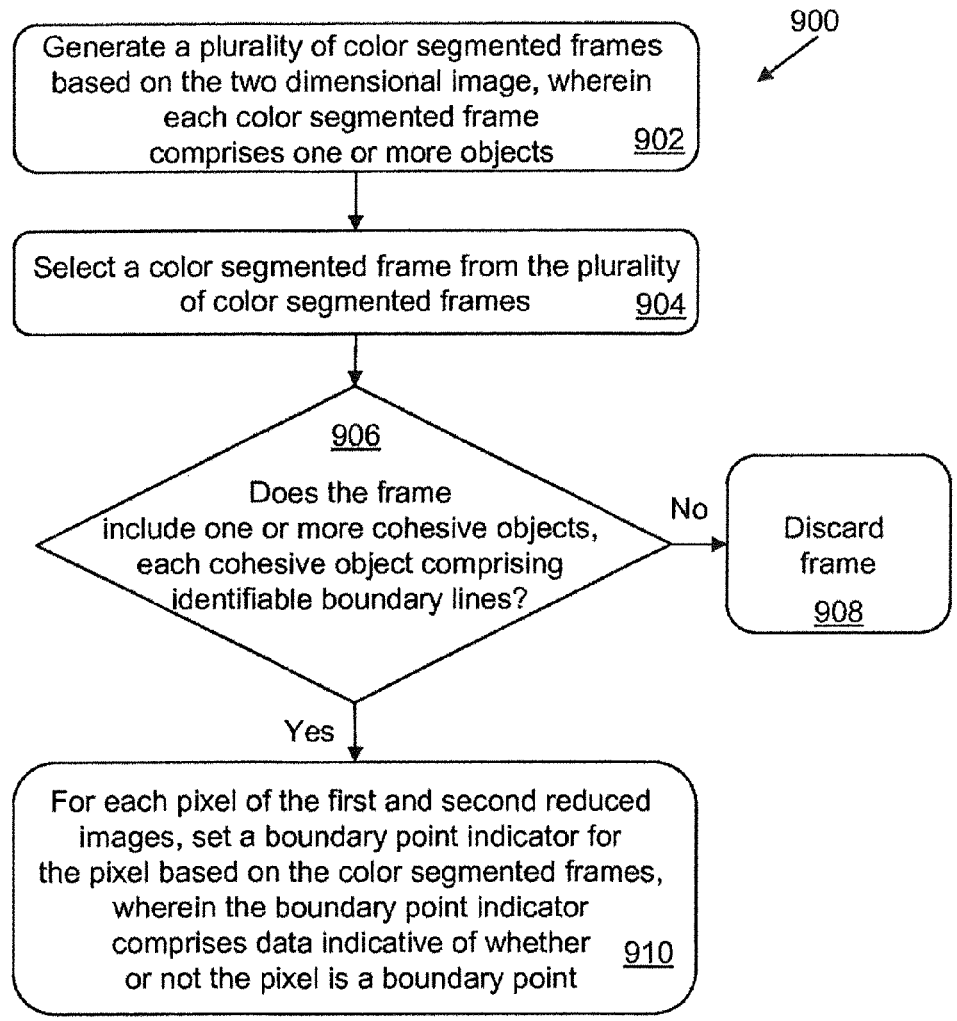
FIG. 9 illustrates an exemplary method for manipulating objects according to the present invention.

FIG. 9 illustrates an exemplary method 900 for manipulating objects according to the present invention. At step 902, the depth generator 104 (i.e., the color segmentation unit 114 and/or the edge generation unit 118) generates a plurality of color segmented frames based on the two dimensional image, wherein each color segmented frame comprises one or more objects. The depth generator 104 can be configured to generate any number of color segmented frames. For example, the depth generator 104 can be configured to generate ten color segmented frames, each color segmented frame corresponding to a different color (e.g., dark red, light red, etc.). At step 904, the depth generator 104 selects a color segmented frame from the plurality of color segmented frames. At step 906, the depth generator verifies that the color segmented frame includes one or more cohesive objects, each cohesive object comprising identifiable boundary lines. If, at step 906 the depth generator 104 determines the color segmented frame does not includes one or more cohesive objects, the method 900 proceeds to step 908 and the depth generator 104 discards the color segmented frame (i.e., the frame is not used to calculate a depth map). If, at step 906 the depth generator 104 determines the color segmented frame includes one or more cohesive objects, for each pixel of the first and second reduced pixel images, the depth generator 104 sets a boundary point indicator for the pixel based on the color segmented frames, wherein the boundary point indicator comprises data indicative of whether or not the pixel is a boundary point.

Referring to step 906, the each color segmented frame should be closed to make the depth data. Generally, this means the color segmented frame should include at least one cohesive figure with defined boundary lines. If the color segmented frame has multiple objects (e.g., if the original image is of a human, and a particular color segmented frame includes separate objects representing only portions of the human, such as a separate object for the hand, for the foot, and one for the face, but the rest of the body is not shown for the particular segmentation frame) such a color segmented frame is still considered closed for the purposes of step 906 as long as each object has defined boundaries. An example of a color segmented frame that is not closed is a frame in which the image consists mostly of a spray or scattering of pixels and there is no definable, main body of interest within the color segmented frame.

In some embodiments, the depth generator 104 can include a configurable parameter that is associated with the depth map that controls the generation of the three dimensional object (e.g., when generated by the conversion unit 108). For example, the configurable parameter can be set or adjusted (e.g., via input unit 106) to configure the conversion unit 108 to render the images as two dimensional images, three dimensional images, images formatted for display on a cell phone, etc. Similarly, in some examples, the configurable parameter can be adjusted to control the amount of parallax for three dimensional images to preserve the proper dimensions of the objects in the three dimensional scene, to adjust the three dimensional images for various screen sizes and room sizes (e.g., not just calculating the three dimensional display once for a particular room size, but allowing the three dimensional images to be adjusted on the fly for various display applications). The configurable parameter can be set or adjusted based on, for example, image safety.

Figure 10:
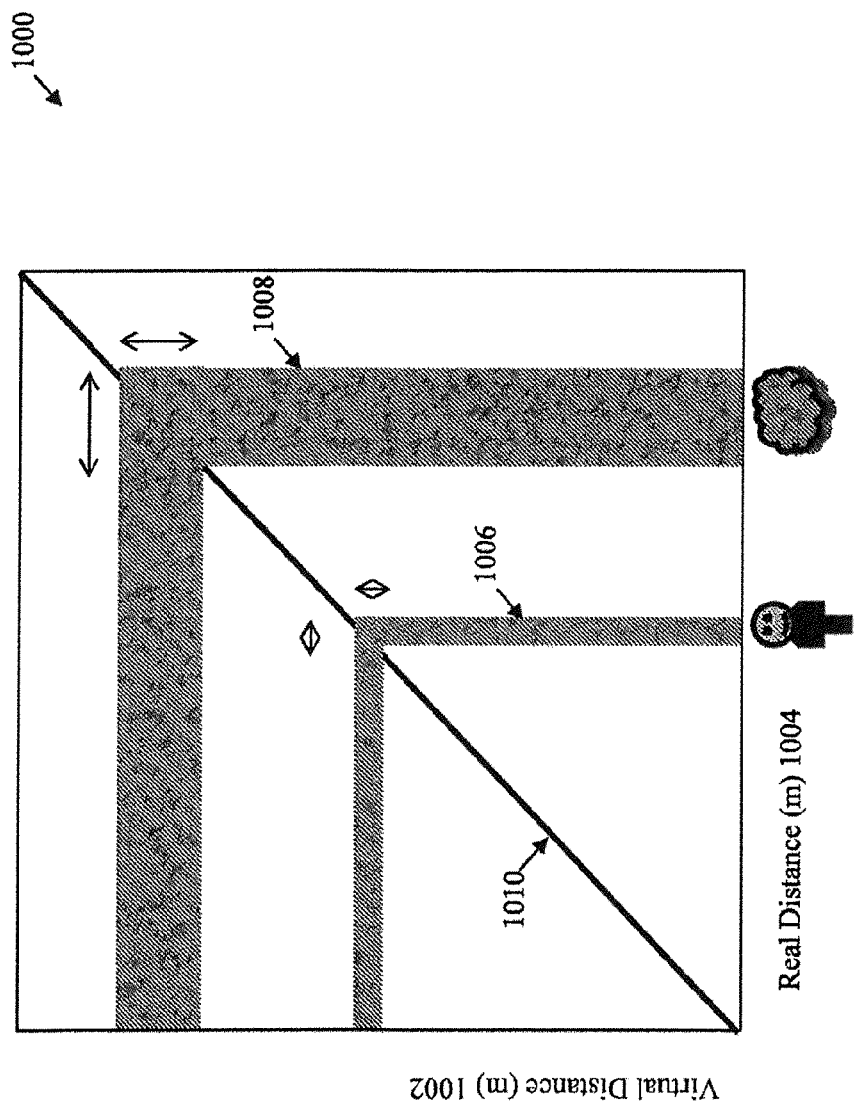
FIG. 10 illustrates an exemplary diagram of the relation between virtual distance and real distance according to the present invention.

FIG. 10 illustrates an exemplary diagram 1000 of the relation between virtual distance and real distance according to the present invention. The vertical axis shows the virtual distance 1002 (e.g., as measured in meters (m)), and the horizontal axis shows the real distance 1004 (e.g., as measured in meters (m)). Zone 1006 is a representation of the virtual distance 1002 compared to the real distance 1004 for a thickness of a first object (e.g., a person). Zone 1008 is a representation of the virtual distance 1002 compared to the real distance 1004 for a thickness of a second object (e.g., a tree). As shown by the line 1010, the relationship between the virtual distance 1002 and the real distance 1004 for the first and second object is a one-to-one relationship, which properly preserves the true distance and thickness of objects within the two dimensional image once they are rendered to a three dimensional depiction.

Figure 11:
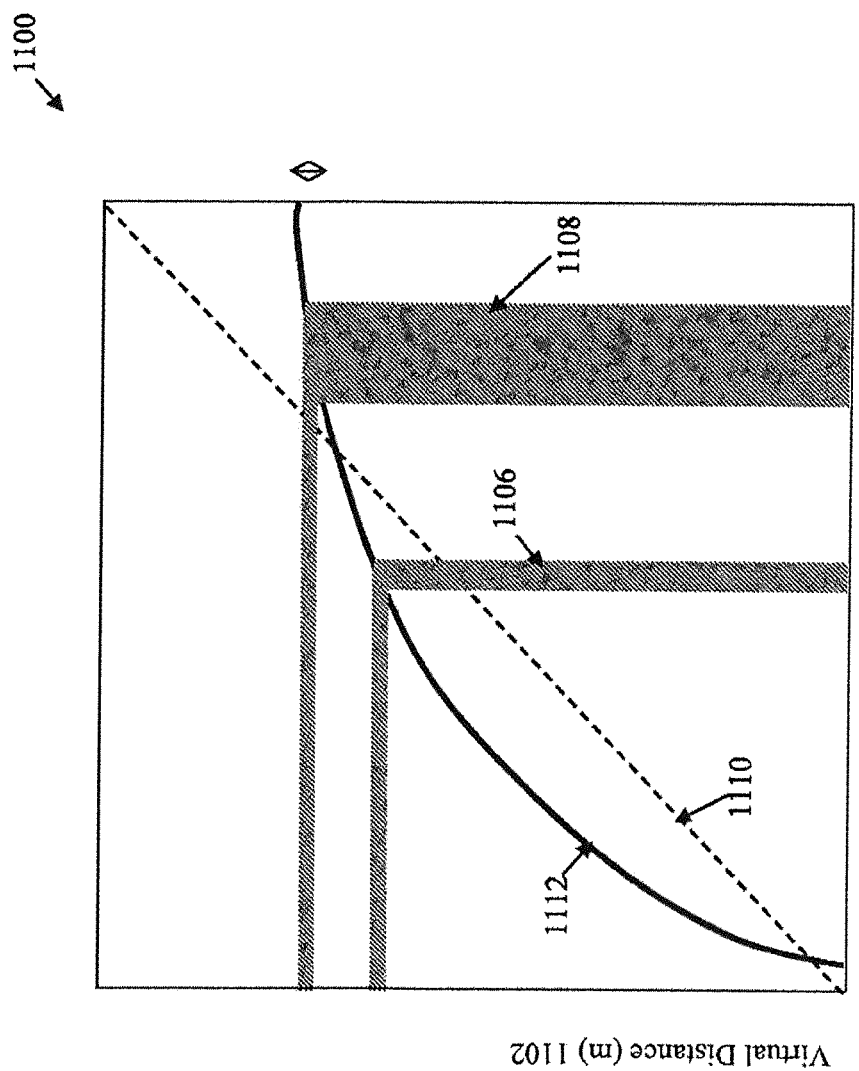
FIG. 11 illustrates an exemplary diagram of the relation between virtual distance and real distance according to the present invention.

FIG. 11 illustrates an exemplary diagram 1100 of the relation between virtual distance and real distance according to the present invention. The vertical axis shows the virtual distance 1102, and the horizontal axis shows the real distance 1104, as with FIG. 10. Zone 1106 is a representation of the virtual distance 1102 compared to the real distance 1104 for the thickness of the first object. Zone 1108 is a representation of the virtual distance 1102 compared to the real distance 1104 for the thickness of the second object. Line 1110, shows what a one-to-one ratio of the relationship between the virtual distance 1102 and the real distance 1104 would be if properly preserved. However, curve 1112 shows how the ratios for the first and second objects depend on camera parameter and screen size (e.g., the "cardboard effect" can happen when camera convergence is narrow, the lens angle of the field is wide, or the screen size is small). As shown by the curve 1112 and zone 1108, the virtual thickness of zone 1108 is thinner than the real thickness, which results in the "cardboard effect" (e.g., the tree appears thinner than they actually appear in real life).

Figure 12:
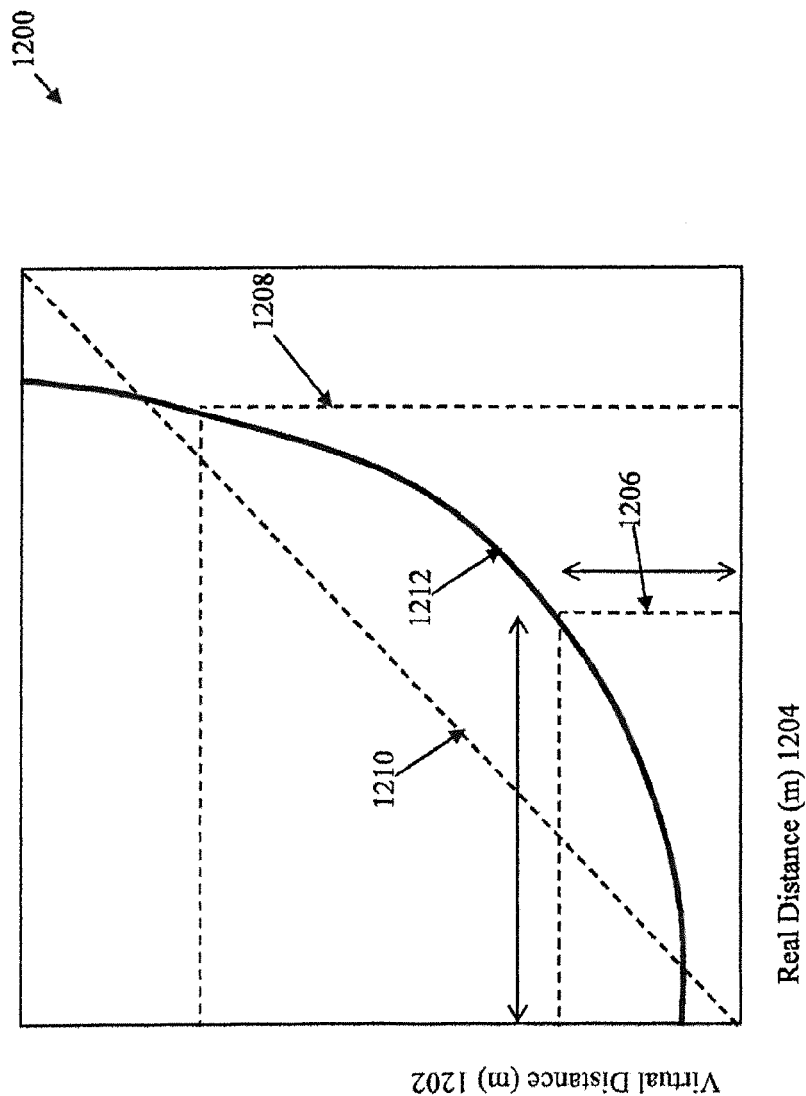
FIG. 12 illustrates an exemplary diagram of the relation between virtual distance and real distance according to the present invention.

Similar to FIG. 11, FIG. 12 illustrates an exemplary diagram 1200 of the relation between virtual distance and real distance according to the present invention. The vertical axis shows the virtual distance 1202, and the horizontal axis shows the real distance 1204, as with FIGS. 10 and 11. Line 1206 is a representation of the virtual distance 1202 compared to the real distance 1204 for the first object. Line 1208 is a representation of the virtual distance 1202 compared to the real distance 1204 for the second object. Line 1210, shows what a one-to-one ratio of the relationship between the virtual distance 1202 and the real distance 1204 would be if properly preserved. Similar to curve 1112 of FIG. 11, curve 1212 shows how the ratios for the first and second objects depend on camera parameter and screen size (e.g., the midget effect can happen when camera convergence is wide, the lens angle of the field is narrow, or the screen size is big). As shown by the curve 1212 and line 1206, the virtual distance 1202 is shorter than the real distance 1204, which results in an effect often called the "midget effect" (e.g., the person appears shorter than they actually appear in real life).

Advantageously, the systems and methods can be configured to take into account the cardboard effect and the midget effect as described above when determining depth information for the depth map. For example, the depth information is configured to preserve a one-to-one ratio by multiplying the calibration curve function.

In some embodiments, for stereoscopic imaging a morphed image can be used for both the left and right images. For example, when converting a single two dimensional image into a stereoscopic pair, the original image can be used as the "central point" of the viewpoint. Therefore, when the stereoscopic pair is generated for the original image, the left image of the stereoscopic pair is rendered for a vantage point slightly to the left of the vantage point for the original image, and the right image of the stereoscopic pair is rendered for a vantage point slightly to the right of the vantage point of the original image. In this embodiment, the original image used to create the stereoscopic pair is not used as either the left or right images of the pair.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computerized method for pulling keys from a plurality of segmented images, the method comprising:
   storing data indicative of an image in a data storage device, the image comprising a plurality of fragments;
   generating, by a segmentation unit of a computer, a plurality of segmented frames based on the image, wherein each segmented frame comprises one or more objects;
   generating, by the segmentation unit, for each of the segmented frames, a key based on the one or more objects; and
   calculating, by a depth map unit of the computer, a depth map for the image based on the keys, wherein the depth map comprises data indicative of three dimensional information for each fragment of the image;
   wherein segmented frames are automatically generated by the segmentation unit based on boundary information comprising a line of boundary pixels around one or more closed objects having defined boundaries calculated from the image without requiring additional input from a user.

2. The method of claim 1, further comprising allowing adjustment of points of a map of an object.

3. The method of claim 2, further comprising, for each said segmented frame, defining an edge of each said object of the one or more objects, comprising:
   automatically calculating the map of the object, the map comprising a plurality of points about the object and a plurality of curves connecting the plurality of points;
   receiving data indicative of adjusting the map; and
   generating a more-detailed map of the object based on data, wherein the more-detailed map comprises a plurality of additional points in combination with the plurality of points.

4. The method of claim 1, wherein generating the segmented frames comprises
   defining a plurality of base colors, wherein each base color is used to generate a segmented frame.

5. The method of claim 4, wherein each said base color from the plurality of base colors comprises a predefined range of color values, wherein a fragment comprising a color value within the predefined range of color values is associated with a segmented frame generated based on the base color.

6. The method of claim 5, comprising:
   receiving data indicative of a new range of color values for one or more colors of the plurality of base colors; and
   adjusting the predefined range of color values for each of the one or more colors based on data.

7. The method of claim 4, wherein the plurality of base colors comprises, for each color of the plurality of base colors, a color pair that includes a light color and a dark color.

8. The method of claim 4, wherein the plurality of base colors comprises brown and beige.

9. The method of claim 1, wherein calculating the depth map comprises:
   determining a three dimensional representation of an object in the image results in a portion of the object coming in view that was not in view in the image; and
   stretching a background behind the object, a side of the object, or both, to fill in the portion of the object coming into view.

10. The method of claim 1, wherein calculating the depth map comprises:
    determining a three dimensional representation of an object in the image results in a portion of the object going out of view that was in view in the image; and
    shrinking a side of the object to hide the portion of the object going out of view.

11. The method of claim 1, wherein calculating the depth map comprises calculating the three dimensional information for each fragment based on a key factor of the plurality of segmented frames.

12. The method of claim 11, wherein the key factor includes hue, saturation, and lightness of the fragment, and calculating comprises:
    determining whether a level of saturation, a level of lightness, or both are a high level or a low level; and if the level of saturation or the level lightness is said high level, assigning the fragment a near depth value; or if the level of saturation or the level lightness is said low level, assigning the fragment a far depth value.

13. The method of claim 11, wherein the key factor includes an amount of value change among the fragment and a group of neighboring fragments, and calculating comprises:
determining, based on the value change, whether the fragment is part of a flat plane; and if the fragment is part of the flat plane, assigning the fragment a far depth value.

14. The method of claim 11, wherein the key factor includes a position of each of the one or more objects in each segmented frame, and calculating comprises, for each object:
if the position of the object is a lower position of the segmented frame, assigning each said fragment within the object a near depth value;
if the position of the object is an upper position of the segmented frame, assigning each said fragment within the object a far depth value;
if the position of the object is within a corresponding object of another segmented frame, assigning each said fragment within the object a near depth value; or
if the position of the object is at an edge portion of the segmented frame, assigning each said fragment within the object a far depth value.

15. The method of claim 11, wherein the key factor includes a ratio of a size of each of the one or more objects in each segmented frame to a size of the segmented frame, and calculating comprises, for each object, assigning a depth value to each said fragment within the object based on the ratio.

16. The method of claim 11, wherein the key factor includes information indicative of a position of an object in the image and a position of a corresponding object in a sequence of images, and calculating comprises:
determining the position of the object in the image is different than the position of the corresponding object in the sequence of images; and
assigning each said fragment within the object a near depth value.

17. The method of claim 1, further comprising:
storing data indicative of a previously generated depth map in the data storage device, the depth map comprising said data indicative of three dimensional information for each fragment of a corresponding image; and
generating a new depth map based on the previously generated depth map, wherein the new depth map comprises data indicative of a larger range of three dimensional information for each said fragment of said corresponding image.

18. The method of claim 1, wherein calculating the depth map comprises applying one or more experience rules to adjust the depth map, each rule being configured to adjust the depth map based on a human perception of one or more objects in the image.

19. A system for pulling keys from a plurality of segmented images, the system comprising,
a data storage device configured to store data indicative of an image, the image comprising a plurality of fragments;
a segmentation unit in communication with the data storage device configured to:
generate a plurality of segmented frames based on the image, wherein each segmented frame comprises one or more objects; and
generate, for each of the segmented frames, a key based on the one or more objects; and
a depth map unit in communication with the segmentation unit and the data storage device configured to calculate a depth map for the image based on the keys, wherein the depth map comprises data indicative of three dimensional information for each fragment of the image;
wherein segmented frames are automatically generated by the segmentation unit based on boundary information comprising a line of boundary pixels around one or more closed objects having defined boundaries calculated from the image without requiring additional input from a user.

20. The system of claim 19, further comprising an input unit configured to:
receive the data indicative of the image and to store the data in the data storage device; and
receive data indicative of a previously generated depth map and to store the data indicative of the previously generated depth map in the data storage device.

21. The system of claim 19, further comprising an edge generation unit configured to generate edge information for each object in the image.

22. The system of claim 19, further comprising a three dimensional experience unit configured to apply one or more experience rules to adjust the depth map each rule being configured to adjust the depth map based on a human perception of one or more objects in the image.

23. A computer program product, tangibly embodied in a computer readable storage medium, the computer program product including instructions being operable to cause a data processing apparatus to:
store data indicative of an image in a data storage device, the image comprising a plurality of fragments;
generate, by a segmentation unit of a computer, a plurality of segmented frames based on the image, wherein each segmented frame comprises one or more objects;
generate, by the segmentation unit, for each of the segmented frames, a key based on the one or more objects; and
calculate, by a depth map unit of the computer, a depth map for the image based on the keys having been generated, wherein the depth map comprises data indicative of three dimensional information for each fragment of the image;
wherein segmented frames are automatically generated by the segmentation unit based on boundary information comprising a line of boundary pixels around one or more closed objects having defined boundaries calculated from the image without requiring additional input from a user.

* * * * *

UNITED STATES PATENT AND TRADEMARK OFFICE
CERTIFICATE OF CORRECTION

| | | |
|---|---|---|
| PATENT NO. | : 8,977,039 B2 | Page 1 of 1 |
| APPLICATION NO. | : 14/010414 | |
| DATED | : March 10, 2015 | |
| INVENTOR(S) | : Izumi | |

It is certified that error appears in the above-identified patent and that said Letters Patent is hereby corrected as shown below:

In the CLAIMS:

Claim 22, column 26, line 32, delete "map" and insert --map,--.

Signed and Sealed this
Sixteenth Day of February, 2016

Michelle K. Lee
*Director of the United States Patent and Trademark Office*